United States Patent
Kawasaki et al.

(10) Patent No.: US 10,550,446 B2
(45) Date of Patent: *Feb. 4, 2020

(54) HIGH-STRENGTH STEEL SHEET, HIGH-STRENGTH HOT-DIP GALVANIZED STEEL SHEET, HIGH-STRENGTH HOT-DIP ALUMINUM-COATED STEEL SHEET, AND HIGH-STRENGTH ELECTROGALVANIZED STEEL SHEET, AND METHODS FOR MANUFACTURING SAME

(71) Applicant: JFE STEEL CORPORATION, Chiyoda-ku, Tokyo (JP)

(72) Inventors: Yoshiyasu Kawasaki, Tokyo (JP); Hiroshi Matsuda, Tokyo (JP); Takeshi Yokota, Tokyo (JP); Takako Yamashita, Tokyo (JP); Kazuhiro Seto, Tokyo (JP)

(73) Assignee: JFE STEEL CORPORATION, Chiyoda-ku, Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 15/520,531

(22) PCT Filed: Oct. 29, 2015

(86) PCT No.: PCT/JP2015/005458
§ 371 (c)(1),
(2) Date: Apr. 20, 2017

(87) PCT Pub. No.: WO2016/067624
PCT Pub. Date: May 6, 2016

(65) Prior Publication Data
US 2017/0327919 A1    Nov. 16, 2017

(30) Foreign Application Priority Data
Oct. 30, 2014 (JP) .................. 2014-221901

(51) Int. Cl.
*C22C 38/04* (2006.01)
*C22C 38/58* (2006.01)
(Continued)

(52) U.S. Cl.
CPC .............. *C21D 9/46* (2013.01); *B32B 15/012* (2013.01); *B32B 15/013* (2013.01); *C21D 6/001* (2013.01);
(Continued)

(58) Field of Classification Search
CPC ......... C22C 38/04; C22C 38/38; C22C 38/58; C21D 6/005; C21D 2211/001;
(Continued)

(56) References Cited

U.S. PATENT DOCUMENTS 7,413,617 B2   8/2008  Ikeda et al.
9,580,779 B2   2/2017  Kawasaki et al.
(Continued)

FOREIGN PATENT DOCUMENTS

EP   2703512 A1    3/2014
JP   S61157625 A   7/1986
(Continued)

OTHER PUBLICATIONS

Jan. 26, 2016, International Search Report issued in the International Patent Application No. PCT/JP2015/005458.
(Continued)

*Primary Examiner* — Vanessa T. Luk
(74) *Attorney, Agent, or Firm* — Kenja IP Law PC

(57) ABSTRACT

A high-strength steel sheet with excellent formability and high yield ratio that has TS of 980 MPa or more and YR of 68% or more is obtained by providing a predetermined chemical composition and a steel microstructure that contains, in area ratio, 15 to 55% of polygonal ferrite, 8% or more of non-recrystallized ferrite, and 15 to 30% of mar-
(Continued)

tensite, and that contains, in volume fraction, 12% or more of retained austenite, in which the polygonal ferrite has a mean grain size of 4 μm or less, the martensite has a mean grain size of 2 μm or less, the retained austenite has a mean grain size of 2 μm or less, and a value obtained by dividing an Mn content in the retained austenite (in mass %) by an Mn content in the polygonal ferrite (in mass %) equals 2.0 or more.

14 Claims, 1 Drawing Sheet

(51) Int. Cl.
*C21D 8/02* (2006.01)
*C22C 38/38* (2006.01)
*C21D 6/00* (2006.01)
*C21D 9/46* (2006.01)
*C23C 2/02* (2006.01)
*C23C 2/06* (2006.01)
*C23C 2/12* (2006.01)
*C23C 2/28* (2006.01)
*C22C 38/00* (2006.01)
*C22C 38/14* (2006.01)
*C22C 38/60* (2006.01)
*B32B 15/01* (2006.01)
*C22C 38/02* (2006.01)
*C22C 38/06* (2006.01)
*C22C 38/08* (2006.01)
*C22C 38/12* (2006.01)
*C22C 38/16* (2006.01)
*C22C 38/28* (2006.01)
*C23C 2/40* (2006.01)
*C23G 1/00* (2006.01)
*C25D 3/22* (2006.01)

(52) U.S. Cl.
CPC ............ *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0273* (2013.01); *C22C 38/00* (2013.01); *C22C 38/001* (2013.01); *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/38* (2013.01); *C22C 38/58* (2013.01); *C22C 38/60* (2013.01); *C23C 2/02* (2013.01); *C23C 2/06* (2013.01); *C23C 2/12* (2013.01); *C23C 2/28* (2013.01); *C23C 2/40* (2013.01); *C23G 1/00* (2013.01); *C25D 3/22* (2013.01); *C21D 2211/001* (2013.01); *C21D 2211/005* (2013.01); *C21D 2211/008* (2013.01)

(58) Field of Classification Search
CPC ........ C21D 2211/005; C21D 2211/008; C21D 8/0205; C21D 8/0226; C21D 8/0236; C21D 8/0263; C21D 8/0273
See application file for complete search history.

(56) References Cited

U.S. PATENT DOCUMENTS

| | | |
|---|---|---|
| 2014/0050941 A1 | 2/2014 | Kawasaki et al. |
| 2014/0230971 A1 | 8/2014 | Kawasaki et al. |
| 2017/0327919 A1 | 11/2017 | Kawasaki et al. |

FOREIGN PATENT DOCUMENTS

| | | | |
|---|---|---|---|
| JP | H01259120 A | 10/1989 | |
| JP | 2003138345 A | 5/2003 | |
| JP | 2011241429 A | 12/2011 | |
| JP | 2012237054 A | 12/2012 | |
| JP | 2013076162 A | 4/2013 | |
| WO | WO-2012147898 A1 * | 11/2012 | ............... C21D 9/46 |
| WO | 2016067624 A1 | 5/2016 | |

OTHER PUBLICATIONS

Dec. 4, 2019, Office Action issued by the United States Patent and Trademark Office in the United States Patent Application No. 15/516,698.

* cited by examiner

HIGH-STRENGTH STEEL SHEET, HIGH-STRENGTH HOT-DIP GALVANIZED STEEL SHEET, HIGH-STRENGTH HOT-DIP ALUMINUM-COATED STEEL SHEET, AND HIGH-STRENGTH ELECTROGALVANIZED STEEL SHEET, AND METHODS FOR MANUFACTURING SAME

TECHNICAL FIELD

This disclosure relates to a high-strength steel sheet, a high-strength hot-dip galvanized steel sheet, a high-strength hot-dip aluminum-coated steel sheet, and a high-strength electrogalvanized steel sheet, and methods for manufacturing the same, and in particular to, the provision of a steel sheet with excellent formability and high yield ratio that is preferably used in parts in the industrial fields of automobiles, electronics, and the like.

BACKGROUND

In recent years, enhancement of fuel efficiency of automobiles has become an important issue from the viewpoint of global environment protection. Consequently, there is an active movement to reduce the thickness of vehicle body components through increases in strength of vehicle body materials, and thereby reduce the weight of vehicle body itself.

In general, however, strengthening of steel sheets leads to deterioration in formability, causing the problem of cracking during forming. It is thus not simple to reduce the thickness of steel sheets. Therefore, it is desirable to develop materials with increased strength and good formability. In addition to good formability, steel sheets with a tensile strength (TS) of 980 MPa or more are required to have, in particular, enhanced impact energy absorption properties. To enhance impact energy absorption properties, it is effective to increase yield ratio (YR). The reason is that a higher yield ratio enables the steel sheet to absorb impact energy more effectively with less deformation.

For example, JPS61157625A (PTL 1) proposes a high-strength steel sheet with extremely high ductility having a tensile strength of 1000 MPa or higher and a total elongation (EL) of 30% or more, utilizing deformation induced transformation of retained austenite.

In addition, JPH1259120A (PTL 2) proposes a high-strength steel sheet with well-balanced strength and ductility that is obtained from high-Mn steel through heat treatment in a ferrite-austenite dual phase region.

Moreover, JP2003138345A (PTL 3) proposes a high-strength steel sheet with improved local ductility that is obtained from high-Mn steel through hot rolling to have a microstructure containing bainite and martensite after subjection to the hot rolling, followed by annealing and tempering to cause fine retained austenite, and subsequently tempered bainite or tempered martensite in the microstructure.

CITATION LIST

Patent Literature

PTL 1: JPS61157625A
PTL 2: JPH1259120A
PTL 3: JP2003138345A

SUMMARY

Technical Problem

The steel sheet described in PTL 1 is manufactured by austenitizing a steel sheet containing C, Si, and Mn as basic components, and subjecting the steel sheet to a so-called austempering process whereby the steel sheet is quenched to and held isothermally in a bainite transformation temperature range. During the austempering process, C concentrates in austenite to form retained austenite.

However, a high concentration of C beyond 0.3% is required for the formation of a large amount of retained austenite, such a high C concentration above 0.3% leads to a significant decrease in spot weldability, which may not be suitable for practical use in steel sheets for automobiles. Additionally, the main objective of PTL 1 is improving the ductility of steel sheets, without any consideration for the hole expansion formability, bendability, or yield ratio.

PTLs 2 and 3 describes techniques for improving the ductility of steel sheets from the perspective of formability, but do not consider the bendability or yield ratio of the steel sheet.

To address these issues, it could thus be helpful to provide a high-strength steel sheet, a high-strength hot-dip galvanized steel sheet, a high-strength hot-dip aluminum-coated steel sheet, and a high-strength electrogalvanized steel sheet that are excellent in formability with TS of 980 MPa or more and YR of 68% or more, and methods for manufacturing the same.

Solution to Problem

To manufacture a high-strength steel sheet that can address the above issues, with excellent formability as well as high yield ratio and high tensile strength, we made intensive studies from the perspectives of the chemical compositions and manufacturing methods of steel sheets. As a result, we discovered that a high-strength steel sheet with high yield ratio that is excellent in formability such as ductility can be manufactured by appropriately controlling the chemical composition and microstructure of steel.

Specifically, a steel sheet that has a steel composition containing more than 4.20 mass % and 6.00 mass % or less of Mn, with the addition amounts of other alloying elements such as Ti being adjusted appropriately, is hot rolled to obtain a hot-rolled sheet. The hot-rolled sheet is then subjected to pickling to remove scales, retained in a temperature range of $Ac_1$ transformation temperature+20° C. to $Ac_1$ transformation temperature+120° C. for 600 s to 21,600 s, and cold rolled at a rolling reduction of 30% or more to obtain a cold-rolled sheet. Further, the cold-rolled sheet is retained in a temperature range of $Ac_1$ transformation temperature to $Ac_1$ transformation temperature+100° C. for 20 s to 900 s, and subsequently cooled.

Through this process, the cold-rolled sheet has a microstructure that contains, in area ratio, 15% or more and 55% or less of polygonal ferrite, 8% or more of non-recrystallized ferrite, and 15% or more and 30% or less of martensite, where the polygonal ferrite has a mean grain size of 4 μm or less, the martensite has a mean grain size of 2 μm or less, and the retained austenite has a mean grain size of 2 μm or less. Moreover, the microstructure of the cold-rolled sheet can be controlled so that a value obtained by dividing an Mn content in the retained austenite (in mass %) by an Mn content in the polygonal ferrite (in mass %) equals 2.0 or more, making it possible to obtain a volume fraction of 12% or more of retained austenite stabilized with Mn. This disclosure has been made based on these discoveries.

Specifically, the primary features of this disclosure are as described below.

[1] A high-strength steel sheet comprising: a chemical composition containing (consisting of), in mass %, C: 0.030% or more and 0.250% or less, Si: 0.01% or more and 3.00% or less, Mn: more than 4.20% and 6.00% or less, P: 0.001% or more and 0.100% or less, S: 0.0001% or more and 0.0200% or less, N: 0.0005% or more and 0.0100% or less, and Ti: 0.005% or more and 0.200% or less, and the balance consisting of Fe and incidental impurities; and a steel microstructure that contains, in area ratio, 15% or more and 55% or less of polygonal ferrite, 8% or more of non-recrystallized ferrite, and 15% or more and 30% or less of martensite, and that contains, in volume fraction, 12% or more of retained austenite, wherein the polygonal ferrite has a mean grain size of 4 μm or less, the martensite has a mean grain size of 2 μm or less, the retained austenite has a mean grain size of 2 μm or less, and a value obtained by dividing an Mn content in the retained austenite in mass % by an Mn content in the polygonal ferrite in mass % equals 2.0 or more.

[2] The high-strength steel sheet according to [1], wherein the chemical composition further contains, in mass %, at least one selected from the group consisting of Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.000% or less, V: 0.005% or more and 0.500% or less, Mo: 0.005% or more and 1.000% or less, Cu: 0.005% or more and 1.000% or less, Sn: 0.002% or more and 0.200% or less, Sb: 0.002% or more and 0.200% or less, Ta: 0.001% or more and 0.010% or less, Ca: 0.0005% or more and 0.0050% or less, Mg: 0.0005% or more and 0.0050% or less, and REM: 0.0005% or more and 0.0050% or less.

[3] The high-strength steel sheet according to [1] or [2], wherein the steel microstructure further contains, in area ratio, 2% or more of ε phase with an hcp structure.

[4] The high-strength steel sheet according to any one of [1] to [3], wherein the retained austenite has a C content that satisfies the following formula in relation to the Mn content in the retained austenite:

0.04*[Mn content]+0.056−0.180≤[C content]≤0.04*[Mn content]+0.056+0.180 where

[C content] is the C content in the retained austenite in mass %, and

[Mn content] is the Mn content in the retained austenite in mass %.

[5] The high-strength steel sheet according to any one of [1] to [4], wherein when the steel sheet is subjected to tensile working with an elongation value of 10%, a value obtained by dividing a volume fraction of the retained austenite after the tensile working by a volume fraction of the retained austenite before the tensile working equals 0.3 or more.

[6] The high-strength steel sheet according to any one of [1] to [5], wherein the high-strength steel sheet is a high-strength hot-dip galvanized steel sheet comprising a hot-dip galvanized layer.

[7] The high-strength steel sheet according to any one of [1] to [5], wherein the high-strength steel sheet is a high-strength hot-dip aluminum-coated steel sheet comprising a hot-dip aluminum-coated layer.

[8] The high-strength steel sheet according to any one of [1] to [5], wherein the high-strength steel sheet is a high-strength electrogalvanized steel sheet comprising an electrogalvanized layer.

[9] A method for manufacturing the high-strength steel sheet as recited in any one of [1] to [5], the method comprising: heating a steel slab having the chemical composition as recited in [1] or [2] to 1100° C. or higher and 1300° C. or lower; hot rolling the steel slab with a finisher delivery temperature of 750° C. or higher and 1000° C. or lower to obtain a steel sheet; coiling the steel sheet at 300° C. or higher and 750° C. or lower; then subjecting the steel sheet to pickling to remove scales; retaining the steel sheet in a temperature range of $Ac_1$ transformation temperature+20° C. to $Ac_1$ transformation temperature+120° C. for 600 s to 21,600 s; cold rolling the steel sheet at a rolling reduction of 30% or more; and then retaining the steel sheet in a temperature range of $Ac_1$ transformation temperature to $Ac_1$ transformation temperature+100° C. for 20 s to 900 s, and subsequently cooling the steel sheet.

[10] A method for manufacturing the high-strength steel sheet as recited in [6], the method comprising: heating a steel slab having the chemical composition as recited in [1] or [2] to 1100° C. or higher and 1300° C. or lower; hot rolling the steel slab with a finisher delivery temperature of 750° C. or higher and 1000° C. or lower to obtain a steel sheet; coiling the steel sheet at 300° C. or higher and 750° C. or lower; then subjecting the steel sheet to pickling to remove scales; retaining the steel sheet in a temperature range of $Ac_1$ transformation temperature+20° C. to $Ac_1$ transformation temperature+120° C. for 600 s to 21,600 s; cold rolling the steel sheet at a rolling reduction of 30% or more; then retaining the steel sheet in a temperature range of Ac transformation temperature to $Ac_1$ transformation temperature+100° C. for 20 s to 900 s, and subsequently cooling the steel sheet; and then subjecting the steel sheet to galvanizing treatment, either alone or followed by alloying treatment at 450° C. or higher and 600° C. or lower.

[11] A method for manufacturing the high-strength steel sheet as recited in [7], the method comprising: heating a steel slab having the chemical composition as recited in [1] or [2] to 1100° C. or higher and 1300° C. or lower; hot rolling the steel slab with a finisher delivery temperature of 750° C. or higher and 1000° C. or lower to obtain a steel sheet; coiling the steel sheet at 300° C. or higher and 750° C. or lower; then subjecting the steel sheet to pickling to remove scales; retaining the steel sheet in a temperature range of $Ac_1$ transformation temperature+20° C. to $Ac_1$ transformation temperature+120° C. for 600 s to 21,600 s; cold rolling the steel sheet at a rolling reduction of 30% or more; then retaining the steel sheet in a temperature range of Ac transformation temperature to $Ac_1$ transformation temperature+100° C. for 20 s to 900 s, and subsequently cooling the steel sheet; and then subjecting the steel sheet to hot-dip aluminum-coating treatment.

[12] A method for manufacturing the high-strength steel sheet as recited in [8], the method comprising: heating a steel slab having the chemical composition as recited in [1] or [2] to 1100° C. or higher and 1300° C. or lower; hot rolling the steel slab with a finisher delivery temperature of 750° C. or higher and 1000° C. or lower to obtain a steel sheet; coiling the steel sheet at 300° C. or higher and 750° C. or lower; then subjecting the steel sheet to pickling to remove scales; retaining the steel sheet in a temperature range of $Ac_1$ transformation temperature+20° C. to $Ac_1$ transformation temperature+120° C. for 600 s to 21,600 s; cold rolling the steel sheet at a rolling reduction of 30% or more; then retaining the steel sheet in a temperature range of $Ac$ transformation temperature to $Ac_1$ transformation temperature+100° C. for 20 s to 900 s, and subsequently cooling the steel sheet; and then subjecting the steel sheet to electrogalvanizing treatment.

Advantageous Effect

According to the disclosure, it becomes possible to provide a high-strength steel sheet with excellent formability and high yield ratio that exhibits TS of 980 MPa or more and YR of 68% or more. High-strength steel sheets according to the disclosure are highly beneficial in industrial terms, because they can improve fuel efficiency when applied to, for example, automobile structural parts, by a reduction in the weight of automotive bodies.

DETAILED DESCRIPTION

Figure 1:
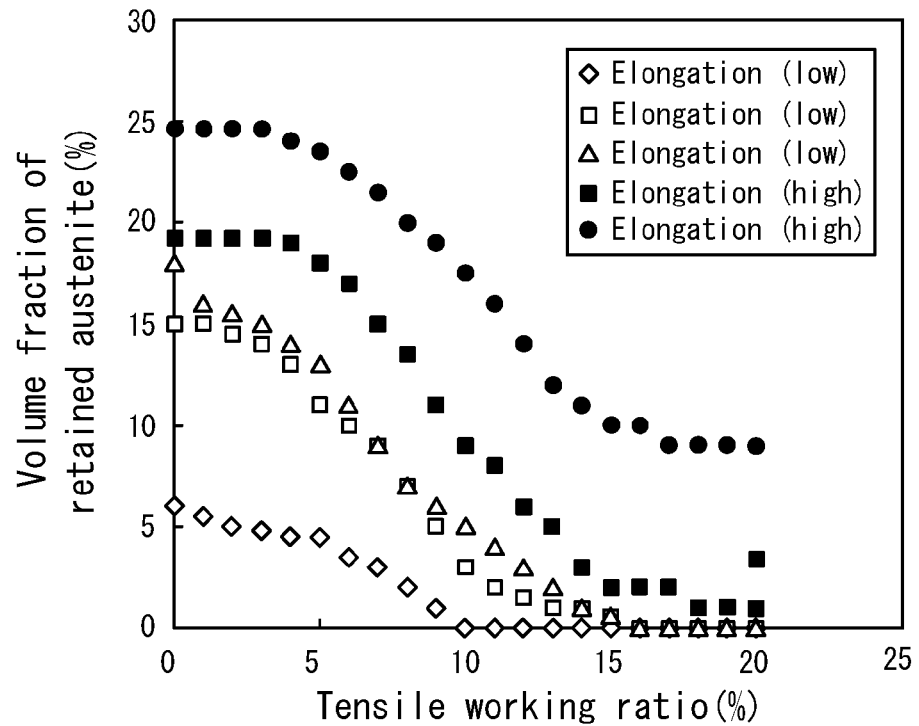
FIG. 1 illustrates the relationship between the working ratio of tensile working and the amount of retained austenite.

The following describes the present disclosure in detail.

First, the reasons for limiting the chemical composition of the steel to the aforementioned ranges in the present disclosure are explained. The % representations below indicating the chemical composition of the steel or steel slab are in mass % unless stated otherwise. The balance of the chemical composition of the steel or steel slab consists of Fe and incidental impurities.

C: 0.030% or More and 0.250% or Less

C is an element necessary for causing a low-temperature transformation phase such as martensite to increase strength. C is also a useful element for increasing the stability of retained austenite and the ductility of steel. If the C content is less than 0.030%, it is difficult to ensure a desired area ratio of martensite, and desired strength is not obtained. It is also difficult to guarantee a sufficient volume fraction of retained austenite, and good ductility is not obtained. On the other hand, if C is excessively added to the steel beyond 0.250%, hard martensite excessively increases in area ratio, which causes more microvoids at grain boundaries of martensite and facilitates propagation of cracks during bend test and hole expansion test, leading to a reduction in bendability and stretch flangeability. If excessive C is added to steel, hardening of welds and the heat-affected zone (HAZ) becomes significant and the mechanical properties of the welds deteriorate, leading to a reduction in spot weldability, arc weldability, and the like. From these perspectives, the C content is 0.030% or more and 0.250% or less. The C content is preferably 0.080% or more. The C content is preferably 0.200% or less.

Si: 0.01% or More and 3.00% or Less

Si is an element that improves the strain hardenability of ferrite, and is thus a useful element for ensuring good ductility. If the Si content is below 0.01%, the addition effect is limited. Thus the lower limit is 0.01%. On the other hand, excessively adding Si beyond 3.00% not only embrittles the steel, but also causes red scales or the like to deteriorate surface characteristics. Therefore, the Si content is 0.01% or more and 3.00% or less. The Si content is preferably 0.20% or more. The Si content is preferably 2.00% or less.

Mn: More than 4.20% and 6.00% or Less

Mn is one of the very important elements for the disclosure. Mn is an element that stabilizes retained austenite, and is thus a useful element for ensuring good ductility. Mn can also increase the strength of the steel through solid solution strengthening. In addition, concentration of Mn in retained austenite can ensure obtaining 2% or more of ε phase with an hcp structure, and furthermore, guarantee the volume fraction of retained austenite being as high as 12% or more. These effects can be obtained only when the Mn content in steel is more than 4.20%. On the other hand, excessively adding Mn beyond 6.00% results in a rise in cost. From these perspectives, the Mn content is more than 4.20% and 6.00% or less. The Mn content is preferably 4.80% or more. The Mn content is preferably 6.00% or less.

P: 0.001% or More and 0.100% or Less

P is an element that has a solid solution strengthening effect and can be added depending on the desired strength. P also facilitates ferrite transformation, and thus is also a useful element for forming a multi-phase structure in the steel sheet. To obtain this effect, the P content in the steel sheet needs to be 0.001% or more. However, if the P content exceeds 0.100%, weldability degrades and, when a galvanized layer is subjected to alloying treatment, the alloying rate decreases, impairing galvanizing quality. Therefore, the P content is 0.001% or more and 0.100% or less. The P content is preferably 0.005% or more. The P content is preferably 0.050% or less.

S: 0.0001% or More and 0.0200% or Less

S segregates to grain boundaries, embrittles the steel during hot working, and forms sulfides to reduce the local deformability of the steel sheet. Therefore, the S content is 0.0200% or less, preferably 0.0100% or less, and more preferably 0.0050% or less. Under production constraints, however, the S content is 0.0001% or more. Therefore, the S content is 0.0001% or more and 0.0200% or less. The S content is preferably 0.0001% or more. The S content is preferably 0.0100% or less. The S content is more preferably 0.0001% or more. The S content is more preferably 0.0050% or less.

N: 0.0005% or More and 0.0100% or Less

N is an element that deteriorates the anti-aging property of the steel. The deterioration in anti-aging property becomes more pronounced, particularly when the N content exceeds 0.0100%. Accordingly, smaller N contents are more preferable. However, under production constraints, the N content is 0.0005% or more. Therefore, the N content is 0.0005% or more and 0.0100% or less. The N content is preferably 0.0010% or more. The N content is preferably 0.0070% or less.

Ti: 0.005% or More and 0.200% or Less

Ti is one of the very important elements for the disclosure. Ti is useful for achieving strengthening by precipitation of the steel. Ti can also ensure a desired area ratio of non-recrystallized ferrite, and contributes to increasing the yield ratio of the steel sheet. Additionally, making use of relatively hard non-recrystallized ferrite, Ti can reduce the difference in hardness from a hard secondary phase (martensite or retained austenite), and also contributes to improving stretch flangeability. These effects can be obtained when the Ti content is 0.005% or more. On the other hand, if the Ti content in the steel exceeds 0.200%, hard martensite excessively increases in area ratio, which causes more microvoids at grain boundaries of martensite and facilitates propagation of cracks during bend test and hole expansion test, leading to a reduction in the bendability and stretch flangeability of the steel sheet. Therefore, the Ti content is 0.005% or more and 0.200% or less. The Ti content is preferably 0.010% or more. The Ti content is preferably 0.100% or less.

The chemical composition of the steel may further contain at least one selected from the group consisting of Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.000% or less, V: 0.005% or more and 0.500% or less, Mo: 0.005% or more and 1.000% or less, Cu: 0.005% or more and 1.000% or less, Sn: 0.002% or more and 0.200% or less, Sb: 0.002% or more and 0.200% or less, Ta: 0.001% or more and 0.010% or less, Ca: 0.0005% or more and 0.0050% or less, Mg: 0.0005% or more and 0.0050% or less, and REM: 0.0005% or more and 0.0050% or less.

Al is a useful element for increasing the area of a ferrite-austenite dual phase region and reducing annealing temperature dependency, i.e., increasing the stability of the steel sheet as a material. In addition, Al acts as a deoxidizer, and is also a useful element for maintaining the cleanliness of the steel. If the Al content is below 0.01%, however, the addition effect is limited. Thus the lower limit is 0.01%. On the other hand, excessively adding Al beyond 2.00% increases the risk of cracking occurring in a semi-finished product during continuous casting, and inhibits manufacturability. From these perspectives, the Al content is 0.01% or more and 2.00% or less. The Al content is preferably 0.20% or more. The Al content is preferably 1.20% or less.

Nb is useful for achieving strengthening by precipitation of the steel. The addition effect can be obtained when the content is 0.005% or more. Nb can also ensure a desired area ratio of non-recrystallized ferrite, as in the case of adding Ti, and contributes to increasing the yield ratio of the steel sheet. Additionally, making use of relatively hard non-recrystallized ferrite, Nb can reduce the difference in hardness from a hard secondary phase (martensite or retained austenite), and also contributes to improving stretch flangeability. On the other hand, if the Nb content in the steel exceeds 0.200%, hard martensite excessively increases in area ratio, which causes more microvoids at grain boundaries of martensite and facilitates propagation of cracks during bend test and hole expansion test. This leads to a reduction in the bendability and stretch flangeability of the steel sheet. This also increases cost. Therefore, when added to steel, the Nb content is 0.005% or more and 0.200% or less. The Nb content is preferably 0.010% or more. The Nb content is preferably 0.100% or less.

B may be added as necessary, since it has the effect of suppressing the generation and growth of ferrite from austenite grain boundaries and enables microstructure control according to the circumstances. The addition effect can be obtained when the B content is 0.0003% or more. If the B content exceeds 0.0050%, however, the formability of the steel sheet degrades. Therefore, when added to steel, the B content is 0.0003% or more and 0.0050% or less. The B content is preferably 0.0005% or more. The B content is preferably 0.0030% or less.

Ni is an element that stabilizes retained austenite, and is thus a useful element for ensuring good ductility, and that increases the strength of the steel through solid solution strengthening. The addition effect can be obtained when the Ni content is 0.005% or more. On the other hand, if the Ni content in the steel exceeds 1.000%, hard martensite excessively increases in area ratio, which causes more microvoids at grain boundaries of martensite and facilitates propagation of cracks during bend test and hole expansion test. This leads to a reduction in the bendability and stretch flangeability of the steel sheet. This also increases cost. Therefore, when added to steel, the Ni content is 0.005% or more and 1.000% or less.

Cr, V, and Mo are elements that may be added as necessary, since they have the effect of improving the balance between strength and ductility. The addition effect can be obtained when the Cr content is 0.005% or more, the V content is 0.005% or more, and/or the Mo content is 0.005% or more. However, if the Cr content exceeds 1.000%, the V content exceeds 0.500%, and/or the Mo content exceeds 1.000%, hard martensite excessively increases in area ratio, which causes more microvoids at grain boundaries of martensite and facilitates propagation of cracks during bend test and hole expansion test. This leads to a reduction in the bendability and stretch flangeability of the steel sheet, and also causes a rise in cost. Therefore, when added to steel, the Cr content is 0.005% or more and 1.000% or less, the V content is 0.005% or more and 0.500% or less, and/or the Mo content is 0.005% or more and 1.000% or less.

Cu is a useful element for strengthening of steel and may be added for strengthening of steel, as long as the content is within the range disclosed herein. The addition effect can be obtained when the Cu content is 0.005% or more. On the other hand, if the Cu content in the steel exceeds 1.000%, hard martensite excessively increases in area ratio, which causes more microvoids at grain boundaries of martensite and facilitates propagation of cracks during bend test and hole expansion test. This leads to a reduction in the bendability and stretch flangeability of the steel sheet. Therefore, when added to steel, the Cu content is 0.005% or more and 1.000% or less.

Sn and Sb are elements that may be added as necessary from the perspective of suppressing decarbonization of a region extending from the surface layer of the steel sheet to a depth of about several tens of micrometers, which results from nitriding and/or oxidation of the steel sheet surface. Suppressing nitriding and/or oxidation in this way is useful for preventing a reduction in the area ratio of martensite in the steel sheet surface, and for ensuring the TS and stability of the steel sheet as a material. However, excessively adding Sn or Sb beyond 0.200% reduces toughness. Therefore, when Sn and/or Sb is added to steel, the content of each added element is 0.002% or more and 0.200% or less.

Ta forms alloy carbides or alloy carbonitrides, and contributes to increasing the strength of the steel, as is the case with Ti and Nb. It is also believed that Ta has the effect of effectively suppressing coarsening of precipitates when partially dissolved in Nb carbides or Nb carbonitrides to form complex precipitates, such as (Nb, Ta) (C, N), and providing a stable contribution to increasing the strength of the steel sheet through strengthening by precipitation. Therefore, Ta is preferably added to the steel according to the disclosure. The addition effect of Ta can be obtained when the Ta content is 0.001% or more. Excessively adding Ta, however, fails to increase the addition effect, but instead results in a rise in alloying cost. Therefore, when added to steel, the Ta content is 0.001% or more and 0.010% or less.

Ca, Mg, and REM are useful elements for causing spheroidization of sulfides and mitigating the adverse effect of sulfides on hole expansion formability (stretch flangeability). To obtain this effect, it is necessary to add any of these elements to steel in an amount of 0.0005% or more.

However, if the content of each added element exceeds 0.0050%, more inclusions occur, for example, and some defects such as surface defects and internal defects are caused in the steel sheet. Therefore, when Ca, Mg, and/or REM is added to steel, the content of each added element is 0.0005% or more and 0.0050% or less.

The following provides a description of the microstructure.

Area Ratio of Polygonal Ferrite: 15% or More and 55% or Less

According to the disclosure, the area ratio of polygonal ferrite needs to be 15% or more to ensure sufficient ductility. On the other hand, to guarantee a strength of 980 MPa or more, the area ratio of soft polygonal ferrite needs to be 55% or less. The area ratio of polygonal ferrite is preferably 20% or more. The area ratio of polygonal ferrite is preferably 50% or less. As used herein, "polygonal ferrite" refers to ferrite that is relatively soft and that has high ductility.

Area Ratio of Non-Recrystallized Ferrite: 8% or More

In this disclosure, it is very important to set the area ratio of non-recrystallized ferrite to be 8% or more. In this regard, non-recrystallized ferrite is useful for increasing the strength of the steel sheet. However, non-recrystallized ferrite may cause a significant decrease in the ductility of the steel sheet, and thus is normally reduced in a general process. In contrast, according to the present disclosure, by using polygonal ferrite and retained austenite to provide good ductility and intentionally utilizing relatively hard non-recrystallized ferrite, it is possible to provide the steel sheet with the intended TS, without having to form a large amount of martensite, such as exceeding 30% in area ratio.

Moreover, according to the present disclosure, interfaces between different phases, namely, between polygonal ferrite and martensite, are reduced, making it possible to increase the yield point (YP) and YR of the steel sheet.

To obtain these effects, the area ratio of non-recrystallized ferrite needs to be 8% or more, preferably 10% or more. As used herein, "non-recrystallized ferrite" refers to ferrite that contains strain in the grains with a crystal orientation difference of less than 15°, and that is harder than the above-described polygonal ferrite with high ductility.

In the disclosure, no upper limit is placed on the area ratio of non-recrystallized ferrite, yet a preferred upper limit is around 45%, considering the possibility of increased material anisotropy in the steel sheet surface.

Area Ratio of Martensite: 15% or More and 30% or Less

To achieve TS of 980 MPa or more, the area ratio of martensite needs to be 15% or more. On the other hand, to ensure good ductility, the area ratio of martensite needs to be limited to 30% or less.

According to the disclosure, the area ratios of ferrite (including polygonal ferrite and non-recrystallized ferrite) and martensite can be determined in the following way.

Specifically, a cross section of a steel sheet that is taken in the sheet thickness direction to be parallel to the rolling direction (which is an L-cross section) is polished, then etched with 3 vol. % nital, and ten locations are observed at 2000 times magnification under an SEM (scanning electron microscope), at a position of sheet thickness×¼ (which is the position at a depth of one-fourth of the sheet thickness from the steel sheet surface), to capture microstructure micrographs. The captured microstructure micrographs are used to calculate the area ratios of respective phases (ferrite and martensite) for the ten locations using Image-Pro manufactured by Media Cybernetics, the results are averaged, and each average is used as the area ratio of the corresponding phase. In the microstructure micrographs, polygonal ferrite and non-recrystallized ferrite appear as a gray structure (base steel structure), while martensite as a white structure.

According to the disclosure, the area ratios of polygonal ferrite and non-recrystallized ferrite can be determined in the following way.

Specifically, low-angle grain boundaries in which the crystal orientation difference is from 2° to less than 15° and large-angle grain boundaries in which the crystal orientation difference is 15° or more are identified using EBSD (Electron Backscatter Diffraction). An IQ Map is then created, considering ferrite that contains low-angle grain boundaries in the grains as non-recrystallized ferrite. Then, low-angle grain boundaries and large-angle grain boundaries are extracted from the created IQ Map at ten locations, respectively, to determine the areas of low-angle grain boundaries and large-angle grain boundaries. Based on the results, the areas of polygonal ferrite and non-recrystallized ferrite are calculated to determine the area ratios of polygonal ferrite and non-recrystallized ferrite for the ten locations. By averaging the results, the above-described area ratios of polygonal ferrite and non-recrystallized ferrite are determined.

Volume Fraction of Retained Austenite: 12% or More

According to the disclosure, the volume fraction of retained austenite needs to be 12% or more, preferably 14% or more, to ensure sufficient ductility. According to the disclosure, no upper limit is placed on the area ratio of retained austenite, yet a preferred upper limit is around 50%, considering the risk of formation of increased amounts of unstable retained austenite resulting from insufficient concentration of C, Mn, and the like, which is less effective in improving ductility.

The volume fraction of retained austenite is calculated by determining the x-ray diffraction intensity of a plane of sheet thickness×¼ (which is the plane at a depth of one-fourth of the sheet thickness from the steel sheet surface), which is exposed by polishing the steel sheet surface to a depth of one-fourth of the sheet thickness. Using an incident x-ray beam of MoKα, the intensity ratio of the peak integrated intensity of the {111}, {200}, {220}, and {311} planes of retained austenite to the peak integrated intensity of the {110}, {200}, and {211} planes of ferrite is calculated for all of the twelve combinations, the results are averaged, and the average is used as the volume fraction of retained austenite.

Mean Grain Size of Polygonal Ferrite: 4 µm or Less

Refinement of polygonal ferrite grains contributes to improving YP and TS. Thus, to ensure a high YP and a high YR as well as a desired TS, polygonal ferrite needs to have a mean grain size of 4 µm or less, and preferably 3 µm or less.

According to the disclosure, no lower limit is placed on the mean grain size of polygonal ferrite, yet, from an industrial perspective, a preferred lower limit is around 0.2 µm.

Mean Grain Size of Martensite: 2 µm or Less

Refinement of martensite grains contributes to improving bendability and stretch flangeability (hole expansion formability). Thus, to ensure high bendability and high stretch flangeability (high hole expansion formability), the mean grain size of martensite needs to be limited to 2 µm or less, and preferably to 1.5 µm or less.

According to the disclosure, no lower limit is placed on the mean grain size of martensite, yet, from an industrial perspective, a preferred lower limit is around 0.05 µm.

Mean Grain Size of Retained Austenite: 2 µm or Less

Refinement of retained austenite grains contributes to improving ductility, as well as bendability and stretch flangeability (hole expansion formability). Accordingly, to ensure good ductility, bendability, and stretch flangeability (hole expansion formability) of the steel sheet, the mean grain size of retained austenite needs to be 2 μm or less, and preferably 1.5 μm or less.

According to the disclosure, no lower limit is placed on the mean grain size of retained austenite, yet, from an industrial perspective, a preferred lower limit is around 0.05 μm.

The mean grain sizes of polygonal ferrite, martensite, and retained austenite are respectively determined by averaging the results from calculating equivalent circular diameters from the areas of polygonal ferrite grains, martensite grains, and retained austenite grains measured with Image-Pro as mentioned above. Martensite and retained austenite are identified using an EBSD phase map. In this case, each of the above-described mean grain sizes is determined from the measurements for grains with a grain size of 0.01 μm or more. The reason is that grains with a grain size of less than 0.01 μm have no effect on the disclosure.

A Value Obtained by Dividing the Mn Content in the Retained Austenite (in Mass %) by the Mn Content in the Polygonal Ferrite (in Mass %): 2.0 or More In this disclosure, it is very important that the value obtained by dividing the Mn content in the retained austenite (in mass %) by the Mn content in the polygonal ferrite (in mass %) equals 2.0 or more. The reason is that better ductility requires a larger amount of stable retained austenite with concentrated Mn.

According to the disclosure, no upper limit is placed on the value obtained by dividing the Mn content in the retained austenite (in mass %) by the Mn content in the polygonal ferrite (in mass %), yet a preferred upper limit is around 16.0 from the perspective of ensuring stretch flangeability.

The Mn content in the retained austenite (in mass %) and the Mn content in the polygonal ferrite (in mass %) can be determined in the following way.

Specifically, an EPMA (Electron Probe Micro Analyzer) is used to quantify the distribution of Mn in each phase in a cross section along the rolling direction at a position of sheet thickness×¼. Then, 30 retained austenite grains and 30 ferrite grains are analyzed to determine Mn contents, the results are averaged, and each average is used as the Mn content in the corresponding phase.

In addition to the above-described polygonal ferrite, martensite, and so on, the microstructure according to the disclosure further include carbides ordinarily found in iron and steel sheets, such as granular ferrite, acicular ferrite, bainitic ferrite, tempered martensite, pearlite, and cementite (excluding cementite in pearlite). Any of these structures may be included as long as the area ratio is 10% or less, without impairing the effect of the disclosure.

According to the disclosure, the steel microstructure preferably contains, in area ratio, 2% or more of ε phase with an hcp structure. In this respect, steel may become brittle when it contains a large amount of ε phase with an hcp structure. As in the present disclosure, however, when an appropriate amount of ε phase with an hcp structure is finely distributed within and along boundaries of ferrite and non-recrystallized ferrite grains, it becomes possible to achieve excellent damping performance, while keeping a good balance between strength and ductility.

Such ε phase with an hcp structure, martensite, and retained austenite can be identified using an EBSD phase map. In this disclosure, no upper limit is placed on the area ratio of ε phase, yet, in view of the risk of embrittlement of the steel, a preferred upper limit is around 35%.

We made further investigations on the microstructures of steel sheets upon performing press forming and working.

As a result, it was discovered that there are two types of retained austenite: one transforms to martensite immediately upon the subjection of the steel sheet to press forming or working, while the other persists until the working ratio becomes high enough to cause the retained austenite to eventually transform to martensite, bringing about a TRIP phenomenon. It was also revealed that good elongation can be obtained in a particularly effective way when a large amount of retained austenite transforms to martensite after the working ratio becomes high enough.

Specifically, as a result of collecting samples with good and poor elongation and measuring the quantity of retained austenite by varying the degree of tensile working from 0% to 20%, the working ratio and the quantity of retained austenite showed a tendency as illustrated in FIG. 1. As used herein, "the working ratio" refers to the elongation ratio that is determined from a tensile test performed on a JIS No. 5 test piece sampled from a steel sheet with the tensile direction being perpendicular to the rolling direction of the steel sheet.

It can be seen from FIG. 1 that the samples with good elongation each showed a gentle decrease in the quantity of retained austenite as the working ratio increased.

Accordingly, we further measured the quantity of retained austenite in each sample with TS of 980 MPa after subjection to tensile working with an elongation value of 10%, and examined the effect of the ratio of the quantity of retained austenite after the tensile working to the quantity before the tensile working on the total elongation of the steel sheet. The results are shown in FIG. 2.

Figure 2:
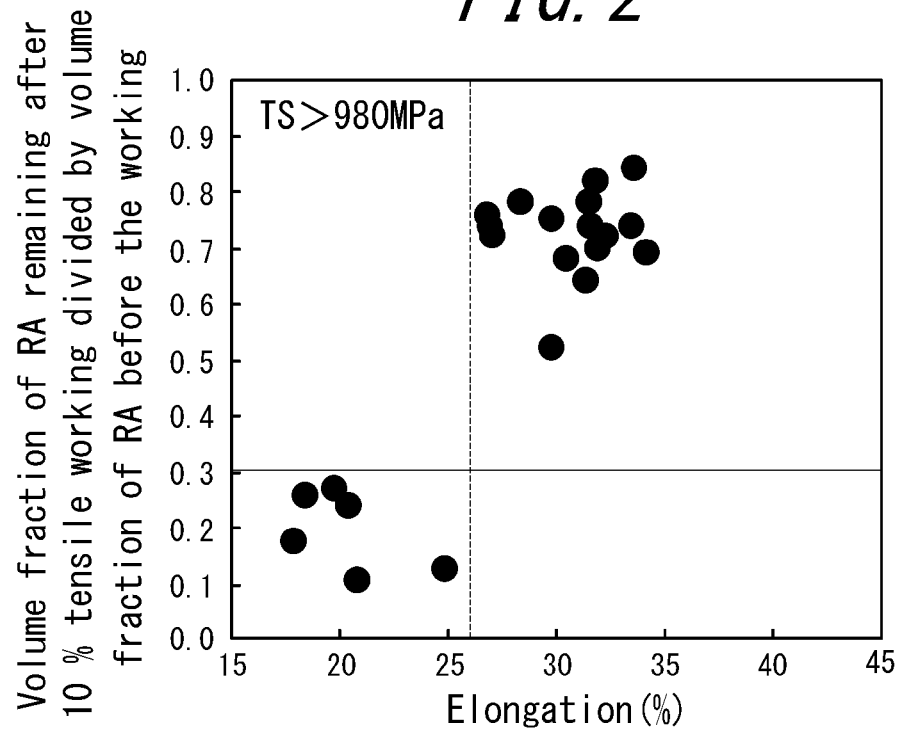
FIG. 2 illustrates the relationship between the elongation of each steel sheet and the value obtained by dividing the volume fraction of retained austenite remaining in the steel sheet after subjection to tensile working with an elongation value of 10% by the volume fraction of retained austenite before the tensile working.

It can be seen from FIG. 2 that elongation is good if the value obtained by dividing the volume fraction of retained austenite remaining in a steel after subjection to tensile working with an elongation value of 10% by the volume fraction of retained austenite before the tensile working equals 0.3 or more, but otherwise elongation is poor.

Therefore, it is preferable in the disclosure that the value obtained by dividing the volume fraction of retained austenite remaining in a steel after subjection to tensile working with an elongation value of 10% by the volume fraction of retained austenite before the tensile working equals 0.3 or more. The reason is that this set up may ensure the transformation of sufficient retained austenite to martensite after the working ratio becomes high enough.

The above-described TRIP phenomenon requires retained austenite to be present before performing press forming or working. Such retained austenite is a phase that remains when the Ms point (martensite transformation start temperature), which depends on the elements contained in the steel microstructure, is as low as approximately 15° C. or lower.

Specifically, in the tensile working with an elongation value of 10% according to the disclosure, a tensile test is performed on a JIS No. 5 test piece sampled from a steel sheet with the tensile direction being perpendicular to the rolling direction of the steel sheet, and the test is interrupted when the elongation ratio reaches 10%.

The volume fraction of retained austenite can be determined in the above-described way.

Upon a detailed study of samples satisfying the above conditions, we discovered that a TRIP phenomenon providing high strain hardenability occurs upon working and even better elongation can be achieved if the C content and the Mn content in the retained austenite satisfy the following relation:

$$0.04*[\text{Mn content}]+0.056-0.180 \leq [\text{C content}] \leq 0.04*[\text{Mn content}]+0.056+0.180$$

where

[C content] is the C content in the retained austenite in mass %, and

[Mn content] is the Mn content in the retained austenite in mass %.

When the above requirements are met, it is possible to cause a transformation induced plasticity (TRIP) phenomenon, which is a key factor of improving ductility, to occur intermittently up until the final stage of working performed on the steel sheet, guaranteeing the generation of so-called stable retained austenite.

The C content in the retained austenite (in mass %) can be determined in the following way.

Specifically, an EPMA is used to quantify the distribution of C in each phase in a cross section along the rolling direction at a position of sheet thickness×¼. Then, 30 retained austenite grains are analyzed to determine C contents, the results are averaged, and the average is used as the C content. Note that the Mn content in the retained austenite (in mass %) can be determined in the same way as the C content in the retained austenite.

The following describes the production conditions.

Steel Slab Heating Temperature: 1100° C. or Higher and 1300° C. or Lower

Precipitates that are present at the time of heating of a steel slab (hereinafter, also referred to simply as a "slab") will remain as coarse precipitates in the resulting steel sheet, making no contribution to strength. Thus, remelting of any Ti- and Nb-based precipitates formed during casting is required.

In this respect, if a steel slab is heated at a temperature below 1100° C., it is difficult to cause sufficient dissolution of carbides, leading to problems such as an increased risk of trouble during the hot rolling resulting from increased rolling load. Therefore, the steel slab heating temperature needs to be 1100° C. or higher.

In addition, from the perspective of obtaining a smooth steel sheet surface by scaling-off defects in the surface layer of the slab, such as blow hole generation, segregation, and the like, and reducing cracks and irregularities over the steel sheet surface, the steel slab heating temperature needs to be 1100° C. or higher.

If the steel slab heating temperature exceeds 1300° C., however, scale loss increases as oxidation progresses. Therefore, the steel slab heating temperature needs to be 1300° C. or lower. For this reason, the steel slab heating temperature is 1100° C. or higher and 1300° C. or lower. The steel slab heating temperature is preferably 1150° C. or higher. The steel slab heating temperature is preferably 1250° C. or lower.

A steel slab is preferably made with continuous casting to prevent macro segregation, yet may be produced with other methods such as ingot casting or thin slab casting. The steel slab thus produced may be cooled to room temperature and then heated again according to a conventional process. Moreover, energy-saving processes are applicable without any problem, such as hot direct rolling or direct rolling in which either a warm steel slab without being fully cooled to room temperature is charged into a heating furnace, or a steel slab is hot rolled immediately after being subjected to heat retaining for a short period. A steel slab is subjected to rough rolling under normal conditions and formed into a sheet bar. When the heating temperature is low, it is preferable to additionally heat the sheet bar using a bar heater or the like prior to finish rolling, from the viewpoint of preventing troubles during the hot rolling.

Finisher Delivery Temperature in Hot Rolling: 750° C. or Higher and 1000° C. or Lower The heated steel slab is hot rolled through rough rolling and finish rolling to form a hot-rolled sheet. At this point, when the finisher delivery temperature exceeds 1000° C., the amount of oxides (scales) generated suddenly increases and the interface between the steel substrate and oxides becomes rough, which tends to lower the surface quality of the steel sheet after subjection to pickling and cold rolling. In addition, any hot rolling scales persisting after pickling adversely affect the ductility and stretch flangeability of the steel sheet. Moreover, grain size is excessively coarsened, causing surface deterioration in a pressed part during working. On the other hand, if the finisher delivery temperature is below 750° C., rolling load increases and rolling is performed more often with austenite being in a non-recrystallized state. As a result, an abnormal texture develops in the steel sheet, and the final product has a significant planar anisotropy such that the material properties not only become less uniform (the stability as a material decreases), but the ductility itself also deteriorates.

Therefore, the finisher delivery temperature in the hot rolling needs to be 750° C. or higher and 1000° C. or lower. The finisher delivery temperature is preferably 800° C. or higher. The finisher delivery temperature is preferably 950° C. or lower.

Mean Coiling Temperature after Hot Rolling: 300° C. or Higher and 750° C. or Lower When the mean coiling temperature after the hot rolling is above 750° C., the grain size of ferrite in the microstructure of the hot-rolled sheet increases, making it difficult to ensure a desired strength of the final-annealed sheet. On the other hand, when the mean coiling temperature after the hot rolling is below 300° C., there is an increase in the strength of the hot-rolled sheet and in the rolling load for cold rolling, and the steel sheet suffers malformation. As a result, productivity decreases. Therefore, the mean coiling temperature after the hot rolling needs to be 300° C. or higher and 750° C. or lower. The mean coiling temperature is preferably 400° C. or higher. The mean coiling temperature is preferably 650° C. or lower.

According to the disclosure, finish rolling may be performed continuously by joining rough-rolled sheets during the hot rolling. Rough-rolled sheets may be coiled on a temporary basis. At least part of finish rolling may be conducted as lubrication rolling to reduce the rolling load during the hot rolling. Conducting lubrication rolling in such a manner is effective from the perspective of making the shape and material properties of the steel sheet uniform. In lubrication rolling, the coefficient of friction is preferably 0.10 or more. The coefficient of friction is preferably 0.25 or less.

The hot-rolled sheet thus produced is subjected to pickling. Pickling enables removal of oxides from the steel sheet surface, and is thus important to ensure that the high-strength steel sheet as the final product has good chemical convertibility and sufficient coating quality. The pickling may be performed in one or more batches.

Hot Band Annealing (Heat Treatment): To Retain in a Temperature Range of $Ac_1$ Transformation Temperature+ 20° C. to $Ac_1$ Transformation Temperature+120° C. for 600 s to 21,600 s In this disclosure, it is very important to retain the steel sheet in a temperature range of $Ac_1$ transformation temperature+20° C. to $Ac_1$ transformation temperature+120° C. for 600 s to 21,600 s.

If the hot band annealing is performed at an annealing temperature below $Ac_1$ transformation temperature+20° C. or above $Ac_1$ transformation temperature+120° C., or if the holding time is shorter than 600 s, concentration of Mn in austenite does not proceed in either case, making it difficult to ensure a sufficient volume fraction of retained austenite after the final annealing. As a result, ductility decreases. On the other hand, if the steel sheet is retained for more than 21,600 s, concentration of Mn in austenite reaches a plateau, and becomes less effective in improving ductility after the final annealing, resulting in a rise in costs.

Therefore, in the hot band annealing (heat treatment) according to the disclosure, the steel sheet is retained in a temperature range of Ac transformation temperature+20° C. to $Ac_1$ transformation temperature+120° C. for 600 s to 21,600 s.

The above-described heat treatment process may be continuous annealing or batch annealing. After the above-described heat treatment, the steel sheet is cooled to room temperature. The cooling process and cooling rate are not particularly limited, however, and any type of cooling may be performed, including furnace cooling and air cooling in batch annealing and gas jet cooling, mist cooling, and water cooling in continuous annealing. The pickling may be performed according to a conventional process.

Rolling Reduction in Cold Rolling: 30% or More

The cold rolling according to the disclosure is performed at a rolling reduction of 30% or more. By performing the cold rolling at a rolling reduction of 30% or more, fine austenite is formed during heat treatment. As a result, fine retained austenite and martensite are formed in the steel sheet, improving the balance between strength and ductility. The bendability and stretch flangeability (hole expansion formability) of the steel sheet are also improved.

No upper limit is placed on the rolling reduction in the cold rolling according to the disclosure, yet a preferred upper limit is around 85% from the perspective of preventing excessive cold rolling load.

Cold-Rolled Sheet Annealing (Heat Treatment): To Retain in a Temperature Range of $Ac_1$ Transformation Temperature to $Ac_1$ Transformation Temperature+100° C. for 20 s to 900 s In this disclosure, it is very important to retain the steel sheet in a temperature range of $Ac_1$ transformation temperature to $Ac_1$ transformation temperature+100° C. for 20 s to 900 s. When the annealing temperature at which the cold-rolled sheet is annealed is below $Ac_1$ transformation temperature or above $Ac_1$ transformation temperature+100° C., or if the holding time is shorter than 20 s, concentration of Mn in austenite does not proceed in either case, making it difficult to ensure a sufficient volume fraction of retained austenite. As a result, ductility decreases. On the other hand, if the steel sheet is retained for more than 900 s, the area ratio of non-crystallized ferrite decreases and the interfaces between different phases, namely, between ferrite and hard secondary phases (martensite and retained austenite), are reduced, leading to a reduction in both YP and YR.

Hot-Dip Galvanizing Treatment

In hot-dip galvanizing treatment according to the disclosure, the steel sheet subjected to the above-described cold-rolled sheet annealing (heat treatment) is dipped in a galvanizing bath at 440° C. or higher and 500° C. or lower for hot-dip galvanizing. Subsequently, the coating weight on the steel sheet surface is adjusted using gas wiping or the like. Preferably, the hot-dip galvanizing is performed using a galvanizing bath containing 0.10 mass % or more and 0.22 mass % or less of Al.

Moreover, when a hot-dip galvanized layer is subjected to alloying treatment, the alloying treatment may be performed in a temperature range of 450° C. to 600° C. after the above-described hot-dip galvanizing treatment. If the alloying treatment is performed at a temperature above 600° C., untransformed austenite transforms to pearlite, where a desired volume fraction of retained austenite cannot be ensured and ductility degrades. On the other hand, if the alloying treatment is performed at a temperature below 450° C., the alloying process does not proceed, making it difficult to form an alloy layer.

Therefore, when the galvanized layer is subjected to alloying treatment, the alloying treatment is performed in a temperature range of 450° C. to 600° C.

Although other manufacturing conditions are not particularly limited, the series of processes including the annealing, hot-dip galvanizing, and alloying treatment described above may preferably be performed in a continuous galvanizing line (CGL), which is a hot-dip galvanizing line, from the perspective of productivity.

When hot-dip aluminum coating treatment is performed, the steel sheet subjected to the above-described annealing treatment is dipped in an aluminum molten bath at 660° C. to 730° C. for hot-dip aluminum coating treatment. Subsequently, the coating weight is adjusted using gas wiping or the like. If the steel sheet has a composition such that the temperature of the aluminum molten bath falls within the temperature range of $Ac_1$ transformation temperature to $Ac_1$ transformation temperature+100° C., the steel sheet is preferably subjected to hot-dip aluminum coating treatment because finer and more stable retained austenite can be formed, and therefore further improvement in ductility can be achieved.

According to the disclosure, electrogalvanizing treatment may also be performed. No particular limitations are placed on the electrogalvanizing treatment conditions, yet the electrogalvanizing treatment conditions are preferably set so that the plated layer has a thickness of 5 μm to 15 μm.

According to the disclosure, the above-described "high-strength steel sheet," "high-strength hot-dip galvanized steel sheet," "high-strength hot-dip aluminum-coated steel sheet," and "high-strength electrogalvanized steel sheet" may be subjected to skin pass rolling for the purposes of straightening, adjustment of roughness on the sheet surface, and the like. The skin pass rolling is preferably performed at a rolling reduction of 0.1% or more. The skin pass rolling is preferably performed at a rolling reduction of 2.0% or less.

When the rolling reduction is less than 0.1%, the skin pass rolling becomes less effective and more difficult to control. Thus, a preferable range for the rolling reduction has a lower limit of 0.1%. On the other hand, when the skin pass rolling is performed at a rolling reduction above 2.0%, the productivity of the steel sheet decreases significantly. Thus, the preferable range for the rolling reduction has an upper limit of 2.0%.

The skin pass rolling may be performed on-line or off-line. Skin pass may be performed in one or more batches to achieve a target rolling reduction.

Moreover, the "high-strength steel sheet," "high-strength hot-dip galvanized steel sheet," "high-strength hot-dip aluminum-coated steel sheet," and "high-strength electrogalvanized steel sheet" according to the disclosure may be subjected to a variety of coating treatment options, such as those using coating of resin, fats and oils, and the like.

EXAMPLES

Steels having the chemical compositions as presented in Table 1, with the balance consisting of Fe and incidental impurities, were prepared by steelmaking in a converter, and formed into slabs through continuous casting. The slabs thus obtained were formed into a variety of steel sheets, as described below, by varying the conditions as listed in Table 2.

After being hot rolled, each steel sheet was annealed in a temperature range of $Ac_1$ transformation temperature+20° C. to $Ac_1$ transformation temperature+120° C. After being cold rolled, each steel sheet was annealed in a temperature range of $Ac_1$ transformation temperature to $Ac_1$ transformation temperature+100° C. Consequently, a high-strength cold-rolled steel sheet (CR) was obtained, and subjected to galvanizing treatment to form a hot-dip galvanized steel sheet (GI), a galvannealed steel sheet (GA), a hot-dip aluminum-coated steel sheet (Al), an electrogalvanized steel sheet (EG), or the like.

Used as hot-dip galvanizing baths were a zinc bath containing 0.19 mass % of Al for hot-dip galvanized steel sheets (GI) and a zinc bath containing 0.14 mass % of Al for galvannealed steel sheets (GA). In either case, the bath temperature was 465° C. and the coating weight per side was 45 g/m² (in the case of both-sided coating). For GA, the Fe concentration in the coating layer was adjusted to be 9 mass % or more and 12 mass % or less. The bath temperature of the hot-dip aluminum molten bath for hot-dip aluminum-coated steel sheets was set at 700° C.

For each of the steel sheets thus obtained, the cross-sectional microstructure, tensile property, hole expansion formability, bendability, and the like were investigated. The results are listed in Tables 3 and 4.

The $Ac_1$ transformation temperature was calculated by:

$Ac_1$ transformation temperature (° C.)=751−16*(% C)+11*(% Si)−28*(% Mn)−5.5*(% Cu)−16*(% Ni)+13*(% Cr)+3.4*(% Mo)

where (% C), (% Si), (% Mn), (% Ni), (% Cu), (% Cr), and (% Mo) each represent the content in steel (in mass %) of the element in the parentheses.

Tensile test was performed in accordance with JIS Z 2241 (2011) to measure YP, YR, TS, and EL using JIS No. 5 test pieces, each of which was sampled in a manner that the tensile direction was perpendicular to the rolling direction of the steel sheet. Note that YR is YP divided by TS, expressed as a percentage. In this case, the results were determined to be good when YR≥68% and when TS*EL≥22,000 MPa·%. Also, EL was determined to be good when EL≥26% for TS 980 MPa grade, EL≥22% for TS 1180 MPa grade, and EL≥18% for TS 1470 MPa grade. In this case, a steel sheet of TS 980 MPa grade refers to a steel sheet with TS of 980 MPa or more and less than 1180 MPa, a steel sheet of TS 1180 MPa grade refers to a steel sheet with TS of 1180 MPa or more and less than 1470 MPa, and a steel sheet of TS 1470 MPa grade refers to a steel sheet with TS of 1470 MPa or more and less than 1760 MPa.

Bend test was performed according to the V-block method specified in JIS Z 2248 (1996). Each steel sheet was visually observed under a stereoscopic microscope for cracks on the outside of the bent portion, and the minimum bending radius without cracks was used as the limit bending radius R. In this case, the bendability of the steel sheet was determined to be good if the following condition was satisfied: limit bending radius R at 90° V-bending/t≤2.0 (where t is the thickness of the steel sheet).

Hole expansion test was performed in accordance with JIS Z 2256 (2010). Each of the steel sheets obtained was cut to a size of 100 mm*100 mm, and a hole of 10 mm in diameter was drilled through each sample with clearance 12%±1%. Then, each steel sheet was clamped into a die having an inner diameter of 75 mm with a blank holding force of 9 tons (88.26 kN). In this state, a conical punch of 60° was pushed into the hole, and the hole diameter at the crack initiation limit was measured. Then, to evaluate hole expansion formability, the maximum hole expansion ratio (%) was calculated by:

Maximum hole expansion ratio λ(%)={($D_f$−$D_0$)/$D_0$}*100 where $D_f$ is a hole diameter at the time of occurrence of cracking (mm) and $D_0$ is an initial hole diameter (mm).

In this case, the maximum hole expansion ratio was determined to be good when λ≥20% for TS 980 MPa grade, λ≥15% for TS 1180 MPa grade, and λ≥10% for TS 1470 MPa grade.

The sheet passage ability during hot rolling was determined to be low when it was considered that the risk of troubles, such as malformation during hot rolling due to increased rolling load, would increase because, for example, the hot-rolling finisher delivery temperature was low and rolling would be performed more often with austenite being in a non-crystallized state, or rolling would be performed in an austenite-ferrite dual phase region.

Similarly, the sheet passage ability during cold rolling was determined to be low when it was considered that the risk of troubles, such as malformation during cold rolling due to increased rolling load, would increase because, for example, the coiling temperature during hot rolling was low and the hot-rolled sheet had a steel microstructure in which low-temperature transformation phases, such as bainite and martensite, were dominantly present.

The surface characteristics of each final-annealed sheet were determined to be poor when defects such as blow hole generation and segregation on the surface layer of the slab could not be scaled-off, cracks and irregularities on the steel sheet surface increased, and a smooth steel sheet surface could not be obtained. The surface characteristics of each final-annealed sheet were also determined to be poor when the amount of oxides (scales) generated suddenly increased, interfaces between the steel substrate and oxides were roughened, and the surface quality after pickling and cold rolling degraded, or when hot-rolling scales persisted at least in part after pickling.

In this case, productivity was evaluated according to the lead time costs, including: (1) malformation of a hot-rolled sheet occurred; (2) a hot-rolled sheet requires straightening before proceeding to the subsequent steps; and (3) a prolonged holding time during the annealing treatment. The productivity was determined to be "high" when none of (1) to (3) applied and "low" when any of (1) to (3) applied.

A value was obtained by dividing the volume fraction of retained austenite remaining in each steel sheet after subjection to 10% tensile working by the volume fraction of retained austenite before the working (10%). The volume fraction of retained austenite was measured in accordance with the above procedure.

The measurement results are also listed in Table 3.

The C content in the retained austenite (in mass %) and the Mn content in the retained austenite (in mass %) were measured in accordance with the above procedure.

The measurement results are also listed in Table 3.

TABLE 1

| Steel ID | Chemical Composition (mass %) | | | | | | | | | | | | | |
|---|---|---|---|---|---|---|---|---|---|---|---|---|---|---|
| | C | Si | Mn | P | S | N | Ti | Al | Nb | B | Ni | Cr | V | Mo |
| A | 0.117 | 0.40 | 5.03 | 0.020 | 0.0022 | 0.0037 | 0.028 | — | — | — | — | — | — | — |
| B | 0.176 | 0.70 | 5.62 | 0.025 | 0.0025 | 0.0039 | 0.038 | — | — | — | — | — | — | — |
| C | 0.189 | 1.57 | 5.84 | 0.028 | 0.0024 | 0.0036 | 0.062 | — | — | — | — | — | — | — |
| D | 0.174 | 1.62 | 5.24 | 0.021 | 0.0022 | 0.0043 | 0.038 | — | — | — | — | — | — | — |
| E | 0.078 | 0.63 | 5.08 | 0.026 | 0.0021 | 0.0044 | 0.027 | — | — | — | — | — | — | — |
| F | 0.152 | 0.09 | 4.84 | 0.020 | 0.0030 | 0.0033 | 0.015 | — | — | — | — | — | — | — |
| G | 0.208 | 0.93 | 5.64 | 0.026 | 0.0024 | 0.0036 | 0.048 | — | — | — | — | — | — | — |
| H | 0.118 | 0.73 | 4.67 | 0.025 | 0.0024 | 0.0036 | 0.038 | — | — | — | — | — | — | — |
| I | 0.117 | 0.55 | 5.47 | 0.020 | 0.0029 | 0.0035 | 0.040 | — | — | — | — | — | — | — |
| J | <u>0.021</u> | 0.55 | 5.62 | 0.028 | 0.0029 | 0.0034 | 0.043 | — | — | — | — | — | — | — |
| K | 0.216 | <u>4.28</u> | 5.29 | 0.027 | 0.0030 | 0.0036 | 0.030 | — | — | — | — | — | — | — |
| L | 0.200 | 0.73 | <u>2.18</u> | 0.023 | 0.0032 | 0.0037 | 0.031 | — | — | — | — | — | — | — |
| M | 0.186 | 0.67 | 5.61 | 0.024 | 0.0027 | 0.0037 | <u>0.002</u> | — | — | — | — | — | — | — |
| N | 0.218 | 0.39 | 5.62 | 0.021 | 0.0029 | 0.0040 | 0.038 | 0.35 | — | — | — | — | — | — |
| O | 0.196 | 0.95 | 5.47 | 0.027 | 0.0030 | 0.0036 | 0.034 | — | 0.042 | — | — | — | — | — |
| P | 0.206 | 0.89 | 5.44 | 0.026 | 0.0026 | 0.0039 | 0.025 | — | — | 0.0021 | — | — | — | — |
| Q | 0.247 | 1.28 | 5.39 | 0.027 | 0.0025 | 0.0034 | 0.035 | — | — | — | 0.345 | — | — | — |
| R | 0.147 | 0.41 | 4.81 | 0.030 | 0.0025 | 0.0034 | 0.033 | — | — | — | — | 0.245 | — | — |
| S | 0.147 | 0.75 | 4.69 | 0.027 | 0.0025 | 0.0034 | 0.029 | — | — | — | — | — | 0.044 | — |
| T | 0.143 | 0.60 | 5.19 | 0.024 | 0.0028 | 0.0038 | 0.041 | — | — | — | — | — | — | 0.422 |
| U | 0.116 | 1.51 | 4.92 | 0.030 | 0.0029 | 0.0037 | 0.040 | — | — | — | — | — | — | — |
| V | 0.123 | 0.62 | 4.89 | 0.025 | 0.0035 | 0.0036 | 0.027 | — | — | — | — | — | — | — |
| W | 0.135 | 0.65 | 4.99 | 0.026 | 0.0025 | 0.0037 | 0.041 | — | — | — | — | — | — | — |
| X | 0.212 | 0.75 | 5.39 | 0.028 | 0.0020 | 0.0046 | 0.045 | — | 0.047 | — | — | — | — | — |
| Y | 0.218 | 0.49 | 5.03 | 0.026 | 0.0030 | 0.0039 | 0.043 | — | 0.054 | — | — | — | — | — |
| Z | 0.227 | 0.35 | 5.56 | 0.025 | 0.0028 | 0.0046 | 0.020 | — | 0.042 | — | — | — | — | — |
| AA | 0.228 | 1.03 | 5.24 | 0.030 | 0.0031 | 0.0047 | 0.042 | — | — | — | — | — | — | — |
| AB | 0.213 | 1.34 | 5.15 | 0.031 | 0.0032 | 0.0043 | 0.040 | — | — | — | — | — | — | — |
| AC | 0.209 | 1.30 | 5.34 | 0.028 | 0.0027 | 0.0035 | 0.022 | — | — | — | — | — | — | — |
| AD | 0.182 | 1.12 | 5.04 | 0.026 | 0.0031 | 0.0033 | 0.029 | — | — | — | — | — | — | — |

| Steel ID | Chemical Composition (mass %) | | | | | | | $Ac_1$ transformation temperature (° C.) | Remarks |
|---|---|---|---|---|---|---|---|---|---|
| | Cu | Sn | Sb | Ta | Ca | Mg | REM | | |
| A | — | — | — | — | — | — | — | 613 | Conforming Steel |
| B | — | — | — | — | — | — | — | 599 | Conforming Steel |
| C | — | — | — | — | — | — | — | 602 | Conforming Steel |
| D | — | — | — | — | — | — | — | 619 | Conforming Steel |
| E | — | — | — | — | — | — | — | 614 | Conforming Steel |
| F | — | — | — | — | — | — | — | 614 | Conforming Steel |
| G | — | — | — | — | — | — | — | 610 | Conforming Steel |
| H | — | — | — | — | — | — | — | 626 | Conforming Steel |
| I | — | — | — | — | — | — | — | 602 | Conforming Steel |
| J | — | — | — | — | — | — | — | 599 | Comparative Steel |
| K | — | — | — | — | — | — | — | 647 | Comparative Steel |
| L | — | — | — | — | — | — | — | 695 | Comparative Steel |
| M | — | — | — | — | — | — | — | 598 | Comparative Steel |
| N | — | — | — | — | — | — | — | 594 | Conforming Steel |
| O | — | — | — | — | — | — | — | 605 | Conforming Steel |
| P | — | — | — | — | — | — | — | 605 | Conforming Steel |
| Q | — | — | — | — | — | — | — | 605 | Conforming Steel |
| R | — | — | — | — | — | — | — | 622 | Conforming Steel |
| S | — | — | — | — | — | — | — | 626 | Conforming Steel |
| T | — | — | — | — | — | — | — | 611 | Conforming Steel |
| U | 0.265 | — | — | — | — | — | — | 627 | Conforming Steel |
| V | — | 0.007 | — | — | — | — | — | 619 | Conforming Steel |
| W | — | — | — | 0.006 | — | — | — | 616 | Conforming Steel |
| X | — | — | — | — | — | — | — | 605 | Conforming Steel |
| Y | — | 0.008 | — | — | — | — | — | 612 | Conforming Steel |
| Z | — | — | — | 0.009 | — | — | — | 596 | Conforming Steel |
| AA | — | — | — | — | 0.0021 | — | — | 612 | Conforming Steel |
| AB | — | — | — | — | — | 0.0028 | — | 618 | Conforming Steel |
| AC | — | — | — | — | — | — | 0.0020 | 612 | Conforming Steel |
| AD | — | — | 0.011 | — | — | — | — | 619 | Conforming Steel |

Underlined if outside of the disclosed range.

TABLE 2

| No. | Steel ID | Slab heating temp. (° C.) | Finisher delivery temp. (° C.) | Mean coiling temp. (° C.) | Heat treatment of hot-rolled sheet Heat treatment temp. (° C.) | Heat treatment time (s) | Rolling reduction in cold rolling (%) | Cold-rolled sheet annealing Heat treatment temp. (° C.) | Heat treatment time (s) | Type* | Remarks |
|---|---|---|---|---|---|---|---|---|---|---|---|
| 1 | A | 1220 | 890 | 550 | 653 | 20000 | 58.8 | 643 | 350 | GA | Example |
| 2 | B | 1230 | 880 | 510 | 639 | 15000 | 54.8 | 629 | 300 | CR | Example |
| 3 | C | 1190 | 880 | 610 | 642 | 14000 | 50.0 | 632 | 250 | CR | Example |
| 4 | A | 1220 | 710 | 550 | 642 | 18000 | 47.1 | 632 | 300 | GI | Comparative Example |
| 5 | A | 1230 | 1090 | 500 | 642 | 11000 | 56.3 | 632 | 350 | EG | Comparative Example |
| 6 | A | 1240 | 850 | 840 | 642 | 8000 | 60.0 | 632 | 700 | CR | Comparative Example |
| 7 | A | 1260 | 860 | 520 | 510 | 14000 | 64.7 | 632 | 500 | EG | Comparative Example |
| 8 | A | 1230 | 870 | 500 | 830 | 18000 | 56.3 | 632 | 300 | EG | Comparative Example |
| 9 | A | 1260 | 880 | 580 | 642 | 100 | 50.0 | 632 | 500 | CR | Comparative Example |
| 10 | A | 1220 | 850 | 620 | 642 | 20000 | 9.1 | 616 | 550 | CR | Comparative Example |
| 11 | A | 1230 | 870 | 600 | 642 | 6000 | 57.1 | 520 | 750 | CR | Comparative Example |
| 12 | A | 1200 | 870 | 570 | 642 | 11000 | 51.7 | 800 | 400 | Al | Comparative Example |
| 13 | A | 1220 | 850 | 570 | 642 | 9000 | 58.8 | 632 | 3 | CR | Comparative Example |
| 14 | A | 1190 | 880 | 580 | 642 | 18000 | 58.8 | 632 | 2000 | CR | Comparative Example |
| 15 | D | 1230 | 850 | 540 | 659 | 18000 | 58.8 | 649 | 500 | CR | Example |
| 16 | E | 1230 | 880 | 530 | 654 | 8000 | 57.1 | 644 | 600 | GI | Example |
| 17 | F | 1240 | 890 | 560 | 654 | 16000 | 50.0 | 644 | 600 | CR | Example |
| 18 | G | 1230 | 880 | 600 | 650 | 7000 | 52.9 | 640 | 550 | CR | Example |
| 19 | H | 1250 | 850 | 570 | 666 | 8000 | 48.6 | 656 | 650 | CR | Example |
| 20 | I | 1230 | 910 | 610 | 642 | 15000 | 46.2 | 632 | 300 | GA | Example |
| 21 | J | 1210 | 850 | 640 | 639 | 17000 | 57.1 | 629 | 250 | CR | Comparative Example |
| 22 | K | 1200 | 860 | 630 | 687 | 19000 | 58.8 | 677 | 200 | EG | Comparative Example |
| 23 | L | 1230 | 830 | 580 | 735 | 2000 | 56.3 | 725 | 300 | CR | Comparative Example |
| 24 | M | 1240 | 820 | 550 | 638 | 5000 | 62.5 | 628 | 400 | EG | Comparative Example |
| 25 | N | 1250 | 840 | 590 | 634 | 7000 | 64.7 | 624 | 150 | GI | Example |
| 26 | O | 1260 | 860 | 550 | 645 | 14000 | 50.0 | 635 | 100 | CR | Example |
| 27 | P | 1210 | 890 | 530 | 645 | 20000 | 46.2 | 635 | 200 | GA | Example |
| 28 | Q | 1250 | 830 | 610 | 645 | 18000 | 52.9 | 635 | 320 | CR | Example |
| 29 | R | 1260 | 820 | 570 | 662 | 14000 | 47.1 | 652 | 300 | CR | Example |
| 30 | S | 1230 | 870 | 630 | 666 | 8000 | 55.6 | 656 | 300 | Al | Example |
| 31 | T | 1240 | 810 | 610 | 651 | 7000 | 56.3 | 641 | 200 | GI | Example |
| 32 | U | 1240 | 840 | 540 | 667 | 15000 | 58.8 | 657 | 250 | GI | Example |
| 33 | V | 1230 | 910 | 580 | 659 | 13000 | 56.5 | 649 | 350 | GI | Example |
| 34 | W | 1220 | 900 | 510 | 656 | 10000 | 62.5 | 646 | 300 | EG | Example |
| 35 | X | 1240 | 880 | 600 | 645 | 15000 | 56.3 | 635 | 300 | Al | Example |
| 36 | Y | 1250 | 890 | 530 | 652 | 9000 | 53.8 | 642 | 340 | GA | Example |
| 37 | Z | 1240 | 870 | 550 | 636 | 20000 | 53.3 | 626 | 500 | CR | Example |
| 38 | AA | 1250 | 890 | 530 | 652 | 8000 | 56.3 | 642 | 500 | Al | Example |
| 39 | AB | 1240 | 870 | 550 | 658 | 15000 | 56.3 | 648 | 400 | GI | Example |
| 40 | AC | 1250 | 850 | 540 | 652 | 5000 | 60.0 | 642 | 350 | CR | Example |
| 41 | AD | 1230 | 840 | 530 | 659 | 8000 | 58.8 | 648 | 300 | CR | Example |
| 42 | A | 1220 | 890 | 550 | 651 | 1000 | 58.8 | 620 | 200 | CR | Example |
| 43 | A | 1230 | 870 | 540 | 655 | 8000 | 58.8 | 619 | 250 | CR | Example |

Underlined if outside of the disclosed range.

*CR: cold-rolled steel sheet (without coating), GI: hot-dip galvanized steel sheet (without alloying treatment of galvanized layer), GA: galvannealed steel sheet, Al: hot-dip aluminum-coated steel sheet, EG: electrogalvanized steel sheet

TABLE 3

| No. | Steel ID | Sheet thickness (mm) | Area ratio of F (%) | Area ratio of F' (%) | Area ratio of M (%) | Volume fraction of RA (%) | Area ratio of ε (%) | Mean grain size of F (μm) | Mean grain size of M (μm) | Mean grain size of RA (μm) | Mean Mn content in RA (mass %) | Mean Mn content in F (mass %) |
|---|---|---|---|---|---|---|---|---|---|---|---|---|
| 1 | A | 1.4 | 35.2 | 18.4 | 18.2 | 24.5 | 2.2 | 1.8 | 0.9 | 0.8 | 8.78 | 3.18 |
| 2 | B | 1.4 | 26.8 | 25.4 | 15.8 | 29.8 | 1.8 | 1.7 | 0.7 | 0.6 | 9.12 | 3.11 |

TABLE 3-continued

| No. | | | | | | | | | | | | |
|---|---|---|---|---|---|---|---|---|---|---|---|---|
| 3 | C | 1.6 | 15.8 | 28.2 | 16.8 | 36.8 | 2.1 | 1.6 | 0.8 | 0.5 | 9.03 | 3.15 |
| 4 | A | 1.8 | 34.5 | 17.5 | 32.1 | 9.2 | 0.9 | 2.1 | 1.1 | 1.3 | 8.11 | 3.15 |
| 5 | A | 1.4 | 34.2 | 16.5 | 33.9 | 8.9 | 1.2 | 2.2 | 1.2 | 1.2 | 8.02 | 3.25 |
| 6 | A | 1.0 | 42.4 | 15.9 | 18.4 | 19.6 | 1.1 | 5.2 | 2.9 | 3.1 | 6.89 | 2.97 |
| 7 | A | 1.2 | 34.2 | 17.8 | 18.7 | 23.4 | 2.1 | 2.1 | 1.3 | 1.2 | 6.41 | 3.36 |
| 8 | A | 1.4 | 35.2 | 17.4 | 18.9 | 24.5 | 1.8 | 2.2 | 1.2 | 1.1 | 6.84 | 3.49 |
| 9 | A | 1.2 | 34.1 | 17.9 | 17.8 | 24.9 | 1.6 | 2.1 | 1.1 | 1.0 | 6.94 | 3.59 |
| 10 | A | 2.0 | 37.8 | 19.4 | 26.4 | 8.1 | 1.4 | 3.8 | 3.1 | 2.9 | 8.45 | 3.22 |
| 11 | A | 1.2 | 36.7 | 14.6 | 29.4 | 10.8 | 1.6 | 4.5 | 2.3 | 2.1 | 6.88 | 4.02 |
| 12 | A | 1.4 | 37.5 | 15.4 | 29.8 | 10.4 | 1.3 | 4.6 | 2.1 | 2.4 | 6.48 | 4.06 |
| 13 | A | 1.4 | 36.8 | 16.7 | 27.8 | 9.8 | 1.7 | 4.2 | 2.3 | 2.2 | 6.29 | 3.98 |
| 14 | A | 1.4 | 34.6 | 3.9 | 18.2 | 24.5 | 1.8 | 1.7 | 3.9 | 3.8 | 6.01 | 3.18 |
| 15 | D | 1.4 | 25.8 | 24.1 | 18.5 | 28.9 | 2.1 | 1.6 | 0.8 | 0.6 | 9.02 | 3.05 |
| 16 | E | 1.2 | 34.6 | 19.8 | 19.4 | 25.4 | 0.6 | 1.9 | 1.0 | 0.9 | 8.56 | 3.22 |
| 17 | F | 1.4 | 34.2 | 18.5 | 17.8 | 26.8 | 2.1 | 1.5 | 0.8 | 0.7 | 8.35 | 3.12 |
| 18 | G | 1.6 | 15.9 | 26.8 | 15.4 | 32.9 | 4.2 | 1.5 | 0.7 | 0.8 | 9.12 | 3.09 |
| 19 | H | 1.8 | 33.4 | 18.4 | 18.7 | 26.8 | 2.1 | 1.7 | 0.7 | 0.6 | 9.06 | 3.05 |
| 20 | I | 1.4 | 35.6 | 17.9 | 17.5 | 27.8 | 0.8 | 1.6 | 0.6 | 0.5 | 9.15 | 3.09 |
| 21 | J | 1.2 | 72.8 | 8.5 | 8.9 | 8.4 | 0.7 | 4.5 | 0.4 | 0.3 | 8.01 | 3.11 |
| 22 | K | 1.4 | 50.4 | 12.6 | 18.4 | 12.4 | 1.8 | 4.3 | 1.7 | 1.6 | 8.11 | 3.22 |
| 23 | L | 1.6 | 63.5 | 12.2 | 15.9 | 8.1 | 0.2 | 5.8 | 3.7 | 3.6 | 3.52 | 2.08 |
| 24 | M | 1.2 | 57.6 | 3.9 | 19.4 | 13.2 | 1.9 | 6.2 | 3.5 | 3.4 | 8.04 | 3.34 |
| 25 | N | 1.2 | 32.9 | 20.4 | 19.4 | 26.5 | 0.6 | 1.7 | 1.1 | 0.7 | 8.78 | 3.22 |
| 26 | O | 1.4 | 34.2 | 19.4 | 17.2 | 28.1 | 0.9 | 1.5 | 0.8 | 0.7 | 8.24 | 3.14 |
| 27 | P | 1.4 | 33.9 | 18.4 | 18.5 | 24.5 | 2.5 | 1.3 | 0.6 | 0.7 | 8.68 | 3.29 |
| 28 | Q | 1.6 | 32.8 | 17.2 | 17.8 | 26.4 | 3.1 | 1.2 | 0.8 | 0.6 | 8.78 | 3.09 |
| 29 | R | 1.8 | 35.9 | 17.9 | 18.6 | 27.5 | 0.1 | 1.2 | 0.5 | 0.7 | 8.88 | 3.05 |
| 30 | S | 1.6 | 35.4 | 18.5 | 17.9 | 26.8 | 0.7 | 1.4 | 0.8 | 0.8 | 8.15 | 3.27 |
| 31 | T | 1.4 | 34.6 | 19.4 | 18.4 | 27.5 | 0.0 | 0.9 | 0.7 | 0.9 | 8.25 | 3.24 |
| 32 | U | 1.4 | 34.2 | 18.5 | 18.2 | 26.8 | 2.1 | 1.4 | 0.8 | 0.7 | 8.33 | 3.19 |
| 33 | V | 1.0 | 36.4 | 18.5 | 17.8 | 25.9 | 0.6 | 1.2 | 0.8 | 0.7 | 8.35 | 3.18 |
| 34 | W | 1.2 | 25.7 | 26.8 | 17.7 | 28.5 | 0.7 | 1.4 | 0.6 | 0.7 | 9.22 | 3.09 |
| 35 | X | 1.4 | 27.1 | 26.4 | 17.4 | 26.4 | 2.1 | 1.3 | 0.6 | 0.7 | 9.04 | 3.28 |
| 36 | Y | 1.2 | 24.1 | 24.4 | 16.4 | 32.1 | 2.2 | 1.5 | 0.6 | 0.5 | 9.12 | 3.04 |
| 37 | Z | 1.4 | 33.4 | 17.5 | 18.4 | 29.4 | 0.9 | 1.4 | 0.9 | 0.7 | 8.49 | 3.11 |
| 38 | AA | 1.4 | 32.8 | 18.5 | 16.9 | 26.8 | 2.6 | 1.3 | 0.7 | 0.8 | 8.57 | 3.08 |
| 39 | AB | 1.4 | 35.4 | 17.9 | 17.9 | 27.4 | 0.6 | 1.4 | 0.6 | 0.5 | 8.67 | 3.21 |
| 40 | AC | 1.2 | 33.9 | 17.5 | 17.8 | 28.4 | 2.2 | 1.2 | 0.8 | 0.5 | 8.18 | 3.18 |
| 41 | AD | 1.4 | 31.0 | 18.9 | 19.2 | 29.8 | 0.7 | 1.1 | 0.6 | 0.4 | 8.92 | 3.09 |
| 42 | A | 1.4 | 36.1 | 17.9 | 19.1 | 22.4 | 3.1 | 2.2 | 1.0 | 0.8 | 8.27 | 3.34 |
| 43 | A | 1.4 | 36.5 | 17.5 | 19.5 | 21.8 | 2.4 | 2.3 | 0.9 | 0.7 | 8.19 | 3.56 |

| No. | Mean Mn content in RA/ Mean Mn content in F | 0.04 × (Mn content in RA) + 0.056 − 0.180 (mass %) | 0.04 × (Mn content in RA) + 0.056 + 0.180 (mass %) | Mean C content in RA (mass %) | Volume fraction of RA remaining after 10% tensile working divided by volume fraction of RA before the working | Balance microstructure | Remarks |
|---|---|---|---|---|---|---|---|
| 1 | 2.76 | 0.23 | 0.59 | 0.43 | 0.72 | P, θ, ε | Example |
| 2 | 2.93 | 0.24 | 0.60 | 0.40 | 0.78 | P, θ, ε | Example |
| 3 | 2.87 | 0.24 | 0.60 | 0.45 | 0.67 | P, θ, ε | Example |
| 4 | 2.57 | 0.20 | 0.56 | 0.28 | 0.44 | P, θ, ε | Comparative Example |
| 5 | 2.47 | 0.20 | 0.56 | 0.18 | 0.24 | P, θ, ε | Comparative Example |
| 6 | 2.32 | 0.15 | 0.51 | 0.11 | 0.16 | P, θ, ε | Comparative Example |
| 7 | 1.91 | 0.13 | 0.49 | 0.12 | 0.11 | P, θ, ε | Comparative Example |
| 8 | 1.96 | 0.15 | 0.51 | 0.14 | 0.27 | P, θ, ε | Comparative Example |
| 9 | 1.93 | 0.15 | 0.51 | 0.23 | 0.42 | P, θ, ε | Comparative Example |
| 10 | 2.62 | 0.21 | 0.57 | 0.19 | 0.27 | P, θ, ε | Comparative Example |
| 11 | 1.71 | 0.15 | 0.51 | 0.14 | 0.26 | P, θ, ε | Comparative Example |
| 12 | 1.60 | 0.14 | 0.50 | 0.13 | 0.17 | P, θ, ε | Comparative Example |
| 13 | 1.58 | 0.13 | 0.49 | 0.21 | 0.46 | P, θ, ε | Comparative Example |
| 14 | 1.89 | 0.12 | 0.48 | 0.20 | 0.52 | P, θ, ε | Comparative Example |
| 15 | 2.96 | 0.24 | 0.60 | 0.42 | 0.74 | P, θ, ε | Example |
| 16 | 2.66 | 0.22 | 0.58 | 0.40 | 0.82 | P, θ, ε | Example |
| 17 | 2.68 | 0.21 | 0.57 | 0.42 | 0.75 | P, θ, ε | Example |
| 18 | 2.95 | 0.24 | 0.60 | 0.39 | 0.67 | P, θ, ε | Example |
| 19 | 2.97 | 0.24 | 0.60 | 0.38 | 0.69 | P, θ, ε | Example |
| 20 | 2.96 | 0.24 | 0.60 | 0.44 | 0.70 | P, θ, ε | Example |
| 21 | 2.58 | 0.20 | 0.56 | 0.38 | 0.49 | P, θ, ε | Comparative |

TABLE 3-continued

| | | | | | | | |
|---|---|---|---|---|---|---|---|
| 22 | 2.52 | 0.20 | 0.56 | 0.28 | 0.47 | P, θ, ε | Comparative Example |
| 23 | <u>1.69</u> | 0.02 | 0.38 | 0.10 | 0.52 | P, θ, ε | Comparative Example |
| 24 | 2.41 | 0.20 | 0.56 | 0.12 | 0.13 | P, θ, ε | Comparative Example |
| 25 | 2.73 | 0.23 | 0.59 | 0.42 | 0.81 | P, θ, ε | Example |
| 26 | 2.62 | 0.21 | 0.57 | 0.42 | 0.74 | P, θ, ε | Example |
| 27 | 2.64 | 0.22 | 0.58 | 0.37 | 0.68 | P, θ, ε | Example |
| 28 | 2.84 | 0.23 | 0.59 | 0.43 | 0.74 | P, θ, ε | Example |
| 29 | 2.91 | 0.23 | 0.59 | 0.39 | 0.73 | P, θ, ε | Example |
| 30 | 2.49 | 0.20 | 0.56 | 0.38 | 0.83 | P, θ, ε | Example |
| 31 | 2.55 | 0.21 | 0.57 | 0.39 | 0.64 | P, θ, ε | Example |
| 32 | 2.61 | 0.21 | 0.57 | 0.39 | 0.69 | P, θ, ε | Example |
| 33 | 2.63 | 0.21 | 0.57 | 0.42 | 0.84 | P, θ, ε | Example |
| 34 | 2.98 | 0.24 | 0.60 | 0.39 | 0.76 | P, θ, ε | Example |
| 35 | 2.76 | 0.24 | 0.60 | 0.38 | 0.72 | P, θ, ε | Example |
| 36 | 3.00 | 0.24 | 0.60 | 0.44 | 0.78 | P, θ, ε | Example |
| 37 | 2.73 | 0.22 | 0.58 | 0.38 | 0.74 | P, θ, ε | Example |
| 38 | 2.78 | 0.22 | 0.58 | 0.43 | 0.77 | P, θ, ε | Example |
| 39 | 2.70 | 0.22 | 0.58 | 0.37 | 0.78 | P, θ, ε | Example |
| 40 | 2.57 | 0.20 | 0.56 | 0.42 | 0.72 | P, θ, ε | Example |
| 41 | 2.89 | 0.23 | 0.59 | 0.43 | 0.69 | P, θ, ε | Example |
| 42 | 2.48 | 0.21 | 0.57 | 0.20 | 0.29 | P, θ, ε | Example |
| 43 | 2.30 | 0.20 | 0.56 | 0.19 | 0.28 | P, θ, ε | Example |

Underlined if outside of the disclosed range.
F: polygonal ferrite,
F': non-recrystallized ferrite,
RA: retained austenite,
M: martensite,
P: pearlite,
θ: carbides (such as cementite)
ε: ε phase with hcp structure

TABLE 4

| No. | Steel ID | Sheet thickness (mm) | Sheet passage ability during hot rolling | Sheet passage ability during cold rolling | Surface characteristics of final-annealed sheet | Productivity | YP (MPa) | YR (%) | TS (MPa) | EL (%) | TS × EL (MPa · %) | R/t | λ (%) | Remarks |
|---|---|---|---|---|---|---|---|---|---|---|---|---|---|---|
| 1 | A | 1.4 | High | High | Good | High | 985 | 96.8 | 1018 | 32.2 | 32780 | 0.4 | 36 | Example |
| 2 | B | 1.4 | High | High | Good | High | 1102 | 91.5 | 1204 | 28.4 | 34194 | 0.7 | 29 | Example |
| 3 | C | 1.6 | High | High | Good | High | 1205 | 80.9 | 1489 | 20.2 | 30078 | 1.3 | 20 | Example |
| 4 | A | 1.8 | Low | Low | Poor | Low | 834 | 82.5 | 1011 | 19.8 | 20018 | 1.1 | 19 | Comparative Example |
| 5 | A | 1.4 | High | Low | Poor | Low | 846 | 83.8 | 1009 | 20.4 | 20584 | 1.4 | 20 | Comparative Example |
| 6 | A | 1.0 | High | High | Good | High | 658 | 80.1 | 821 | 26.8 | 22003 | 0.5 | 42 | Comparative Example |
| 7 | A | 1.2 | High | Low | Good | High | 812 | 81.0 | 1002 | 20.8 | 20842 | 1.0 | 28 | Comparative Example |
| 8 | A | 1.4 | High | High | Good | High | 814 | 79.0 | 1031 | 19.7 | 20311 | 0.9 | 27 | Comparative Example |
| 9 | A | 1.2 | High | Low | Good | High | 798 | 79.4 | 1005 | 18.9 | 18995 | 1.0 | 28 | Comparative Example |
| 10 | A | 2.0 | High | High | Good | High | 822 | 80.7 | 1018 | 18.9 | 19240 | 2.3 | 11 | Comparative Example |
| 11 | A | 1.2 | High | High | Good | High | 789 | 77.4 | 1019 | 18.4 | 18750 | 0.8 | 28 | Comparative Example |
| 12 | A | 1.4 | High | High | Good | Low | 814 | 80.1 | 1016 | 17.9 | 18186 | 0.7 | 30 | Comparative Example |
| 13 | A | 1.4 | High | High | Good | High | 813 | 77.9 | 1044 | 18.6 | 19418 | 0.7 | 27 | Comparative Example |
| 14 | A | 1.4 | High | High | Poor | Low | 600 | 58.8 | 1020 | 29.8 | 30396 | 0.9 | 29 | Comparative Example |
| 15 | D | 1.4 | High | High | Good | High | 1054 | 86.1 | 1224 | 26.9 | 32926 | 0.7 | 26 | Example |
| 16 | E | 1.2 | High | High | Good | High | 815 | 81.7 | 998 | 31.8 | 31736 | 0.6 | 34 | Example |
| 17 | F | 1.4 | High | High | Good | High | 812 | 79.8 | 1018 | 29.8 | 30336 | 0.5 | 41 | Example |
| 18 | G | 1.6 | High | High | Good | High | 1251 | 84.4 | 1482 | 21.5 | 31863 | 1.3 | 22 | Example |
| 19 | H | 1.8 | High | High | Good | High | 821 | 81.2 | 1011 | 32.5 | 32858 | 0.6 | 34 | Example |
| 20 | I | 1.4 | High | High | Good | High | 819 | 82.3 | 995 | 31.9 | 31741 | 0.7 | 36 | Example |
| 21 | J | 1.2 | High | High | Good | High | 721 | 87.6 | 823 | 22.4 | 18435 | 0.6 | 42 | Comparative Example |

TABLE 4-continued

| No. | Steel ID | Sheet thickness (mm) | Sheet passage ability during hot rolling | Sheet passage ability during cold rolling | Surface characteristics of final-annealed sheet | Productivity | YP (MPa) | YR (%) | TS (MPa) | EL (%) | TS × EL (MPa · %) | R/t | λ (%) | Remarks |
|---|---|---|---|---|---|---|---|---|---|---|---|---|---|---|
| 22 | K | 1.4 | High | High | Poor | High | 1245 | 71.0 | 1754 | 10.4 | 18242 | 2.1 | 9 | Comparative Example |
| 23 | L | 1.4 | High | High | Good | High | 624 | 61.3 | 1018 | 18.2 | 18528 | 2.1 | 16 | Comparative Example |
| 24 | M | 1.2 | High | High | Good | High | 602 | 60.3 | 998 | 24.9 | 24850 | 2.1 | 18 | Comparative Example |
| 25 | N | 1.2 | High | High | Good | High | 819 | 80.5 | 1018 | 32.4 | 32983 | 0.6 | 31 | Example |
| 26 | O | 1.4 | High | High | Good | High | 798 | 77.9 | 1024 | 31.5 | 32256 | 0.5 | 35 | Example |
| 27 | P | 1.4 | High | High | Good | High | 834 | 80.7 | 1034 | 30.5 | 31537 | 0.5 | 29 | Example |
| 28 | Q | 1.6 | High | High | Good | High | 845 | 85.4 | 989 | 31.8 | 31450 | 0.5 | 34 | Example |
| 29 | R | 1.8 | High | High | Good | High | 860 | 82.6 | 1041 | 31.9 | 33208 | 0.4 | 31 | Example |
| 30 | S | 1.6 | High | High | Good | High | 796 | 77.2 | 1031 | 32.9 | 33920 | 0.5 | 30 | Example |
| 31 | T | 1.4 | High | High | Good | High | 814 | 82.3 | 989 | 31.4 | 31055 | 0.5 | 35 | Example |
| 32 | U | 1.4 | High | High | Good | High | 816 | 79.0 | 1033 | 32.8 | 33882 | 0.5 | 36 | Example |
| 33 | V | 1.0 | High | High | Good | High | 809 | 79.0 | 1024 | 33.6 | 34406 | 0.8 | 34 | Example |
| 34 | W | 1.2 | High | High | Good | High | 1009 | 83.3 | 1212 | 26.8 | 32482 | 0.8 | 21 | Example |
| 35 | X | 1.4 | High | High | Good | High | 957 | 79.9 | 1198 | 27.1 | 32466 | 0.7 | 22 | Example |
| 36 | Y | 1.2 | High | High | Good | High | 968 | 79.0 | 1225 | 25.9 | 31728 | 0.8 | 21 | Example |
| 37 | Z | 1.4 | High | High | Good | High | 804 | 77.1 | 1043 | 33.5 | 34941 | 0.5 | 36 | Example |
| 38 | AA | 1.4 | High | High | Good | High | 825 | 81.0 | 1019 | 32.6 | 33219 | 0.5 | 35 | Example |
| 39 | AB | 1.4 | High | High | Good | High | 789 | 75.4 | 1046 | 31.5 | 32949 | 0.5 | 34 | Example |
| 40 | AC | 1.2 | High | High | Good | High | 814 | 81.5 | 999 | 30.8 | 30769 | 0.6 | 36 | Example |
| 41 | AD | 1.4 | High | High | Good | High | 829 | 75.9 | 1092 | 34.2 | 37346 | 1.3 | 30 | Example |
| 42 | A | 1.4 | High | High | Good | High | 834 | 84.3 | 989 | 27.2 | 26901 | 1.1 | 27 | Example |
| 43 | A | 1.4 | High | High | Good | High | 819 | 82.3 | 995 | 26.8 | 26666 | 1.1 | 25 | Example |

From above, it can be seen that the steel sheets according to the disclosure each exhibited TS of 980 MPa or more and YR of 68% or more, and are thus considered as high-strength steel sheets having excellent formability and high yield ratio. In contrast, the comparative examples are inferior in terms of at least one of YR, TS, EL, λ, or R/t. It will also be appreciated that each steel sheet containing ε phase at an area ratio of 2% or more achieved a still better balance between strength and ductility.

INDUSTRIAL APPLICABILITY

According to the disclosure, it becomes possible to manufacture high-strength steel sheets with excellent formability and high yield ratio that exhibit TS of 980 MPa or more and YR of 68% or more and that satisfy the condition of TS*EL≥22,000 MPa·%. High-strength steel sheets according to the disclosure are highly beneficial in industrial terms, because they can improve fuel efficiency when applied to, for example, automobile structural parts, by a reduction in the weight of automotive bodies.

The invention claimed is:

1. A high-strength steel sheet, having a tensile strength of 980 MPa or more, comprising:
a chemical composition containing, in mass %, C: 0.030% or more and 0.250% or less, Si: 0.01% or more and 3.00% or less, Mn: more than 4.20% and 6.00% or less, P: 0.001% or more and 0.100% or less, S: 0.0001% or more and 0.0200% or less, N: 0.0005% or more and 0.0100% or less, and Ti: 0.005% or more and 0.200% or less, and the balance being Fe and incidental impurities; and
a steel microstructure that contains, in area ratio, 15% or more and 55% or less of polygonal ferrite, 8% or more of non-recrystallized ferrite, and 15% or more and 30% or less of martensite, and that contains, in volume fraction, 12% or more of retained austenite,
wherein the polygonal ferrite has a mean grain size of 4 μm or less, the martensite has a mean grain size of 2 μm or less, the retained austenite has a mean grain size of 2 μm or less, and a value obtained by dividing an Mn content in the retained austenite in mass % by an Mn content in the polygonal ferrite in mass % equals 2.0 or more.

2. The high-strength steel sheet according to claim 1, wherein the chemical composition further contains, in mass %, at least one selected from the group consisting of Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.000% or less, V: 0.005% or more and 0.500% or less, Mo: 0.005% or more and 1.000% or less, Cu: 0.005% or more and 1.000% or less, Sn: 0.002% or more and 0.200% or less, Sb: 0.002% or more and 0.200% or less, Ta: 0.001% or more and 0.010% or less, Ca: 0.0005% or more and 0.0050% or less, Mg: 0.0005% or more and 0.0050% or less, and REM: 0.0005% or more and 0.0050% or less.

3. The high-strength steel sheet according to claim 2, wherein the steel microstructure further contains, in area ratio, 2% or more of ε phase with an hcp structure.

4. The high-strength steel sheet according to claim 2, wherein the retained austenite has a C content that satisfies the following formula in relation to the Mn content in the retained austenite:

$$0.04*[\text{Mn content}]+0.056-0.180[\text{C content}] \leq 0.04*[\text{Mn content}]+0.056+0.180$$

where
[C content] is the C content in the retained austenite in mass %, and
[Mn content] is the Mn content in the retained austenite in mass %.

5. The high-strength steel sheet according to claim 2, wherein when the steel sheet is subjected to tensile working with an elongation value of 10%, a value obtained by dividing a volume fraction of the retained austenite after the tensile working by a volume fraction of the retained austenite before the tensile working equals 0.3 or more.

6. The high-strength steel sheet according to claim 2, wherein the high-strength steel sheet is a high-strength hot-dip galvanized steel sheet comprising a hot-dip galvanized layer, a high-strength hot-dip aluminum-coated steel sheet comprising a hot-dip aluminum-coated layer or a high-strength electrogalvanized steel sheet comprising an electrogalvanized layer.

7. The high-strength steel sheet according to claim 1, wherein the steel microstructure further contains, in area ratio, 2% or more of c phase with an hcp structure.

8. The high-strength steel sheet according to claim 1, wherein the retained austenite has a C content that satisfies the following formula in relation to the Mn content in the retained austenite:

$$0.04*[\text{Mn content}]+0.056-0.180 \leq [\text{C content}] \leq 0.04*[\text{Mn content}]+0.056+0.180$$

where

[C content] is the C content in the retained austenite in mass %, and

[Mn content] is the Mn content in the retained austenite in mass %.

9. The high-strength steel sheet according to claim 1, wherein when the steel sheet is subjected to tensile working with an elongation value of 10%, a value obtained by dividing a volume fraction of the retained austenite after the tensile working by a volume fraction of the retained austenite before the tensile working equals 0.3 or more.

10. The high-strength steel sheet according to claim 1, wherein the high-strength steel sheet is a high-strength hot-dip galvanized steel sheet comprising a hot-dip galvanized layer, a high-strength hot-dip aluminum-coated steel sheet comprising a hot-dip aluminum-coated layer or a high-strength electrogalvanized steel sheet comprising an electrogalvanized layer.

11. A method for manufacturing the high-strength steel sheet as recited in claim 1, the method comprising:

heating a steel slab having the chemical composition containing, in mass %, C: 0.030% or more and 0.250% or less, Si: 0.01% or more and 3.00% or less, Mn: more than 4.20% and 6.00% or less, P: 0.001% or more and 0.100% or less, S: 0.0001% or more and 0.0200% or less, N: 0.0005% or more and 0.0100% or less, and Ti: 0.005% or more and 0.200% or less, and the balance being Fe and incidental impurities, to 1100° C. or higher and 1300° C. or lower;

hot rolling the steel slab with a finisher delivery temperature of 750° C. or higher and 1000° C. or lower to obtain a steel sheet;

coiling the steel sheet at 300° C. or higher and 750° C. or lower;

then subjecting the steel sheet to pickling to remove scales;

retaining the steel sheet in a temperature range of $Ac_1$ transformation temperature+20° C. to $Ac_1$ transformation temperature+120° C. for 600 s to 21,600 s;

cold rolling the steel sheet at a rolling reduction of 30% or more; and then retaining the steel sheet in a temperature range of $Ac_1$ transformation temperature to $Ac_1$ transformation temperature+100° C. for 20 s to 900 s, and subsequently cooling the steel sheet.

12. A method for manufacturing the high-strength steel sheet as recited in claim 10, the method comprising:

heating a steel slab having the chemical composition containing, in mass %, C: 0.030% or more and 0.250% or less, Si: 0.01% or more and 3.00% or less, Mn: more than 4.20% and 6.00% or less, P: 0.001% or more and 0.100% or less, S: 0.0001% or more and 0.0200% or less, N: 0.0005% or more and 0.0100% or less, and Ti: 0.005% or more and 0.200% or less, and the balance being Fe and incidental impurities, to 1100° C. or higher and 1300° C. or lower;

hot rolling the steel slab with a finisher delivery temperature of 750° C. or higher and 1000° C. or lower to obtain a steel sheet;

coiling the steel sheet at 300° C. or higher and 750° C. or lower;

then subjecting the steel sheet to pickling to remove scales;

retaining the steel sheet in a temperature range of $Ac_1$ transformation temperature+20° C. to $Ac_1$ transformation temperature+120° C. for 600 s to 21,600 s;

cold rolling the steel sheet at a rolling reduction of 30% or more;

then retaining the steel sheet in a temperature range of $Ac_1$ transformation temperature to $Ac_1$ transformation temperature+100° C. for 20 s to 900 s, and subsequently cooling the steel sheet; and then subjecting the steel sheet to any one of the following:
galvanizing treatment, either alone or followed by alloying treatment at 450° C. or higher and 600° C. or lower,
hot-dip aluminum-coating treatment, or
electrogalvanizing treatment.

13. A method for manufacturing the high-strength steel sheet as recited in claim 2, the method comprising:

heating a steel slab having the chemical composition containing, in mass %, C: 0.030% or more and 0.250% or less, Si: 0.01% or more and 3.00% or less, Mn: more than 4.20% and 6.00% or less, P: 0.001% or more and 0.100% or less, S: 0.0001% or more and 0.0200% or less, N: 0.0005% or more and 0.0100% or less, and Ti: 0.005% or more and 0.200% or less, and at least one selected from the group consisting of Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.000% or less, V: 0.005% or more and 0.500% or less, Mo: 0.005% or more and 1.000% or less, Cu: 0.005% or more and 1.000% or less, Sn: 0.002% or more and 0.200% or less, Sb: 0.002% or more and 0.200% or less, Ta: 0.001% or more and 0.010% or less, Ca: 0.0005% or more and 0.0050% or less, Mg: 0.0005% or more and 0.0050% or less, and REM: 0.0005% or more and 0.0050% or less, and the balance being Fe and incidental impurities, to 1100° C. or higher and 1300° C. or lower;

hot rolling the steel slab with a finisher delivery temperature of 750° C. or higher and 1000° C. or lower to obtain a steel sheet;

coiling the steel sheet at 300° C. or higher and 750° C. or lower;

then subjecting the steel sheet to pickling to remove scales;

retaining the steel sheet in a temperature range of $Ac_1$ transformation temperature+20° C. to $Ac_1$ transformation temperature+120° C. for 600 s to 21,600 s;

cold rolling the steel sheet at a rolling reduction of 30% or more; and then retaining the steel sheet in a temperature range of $Ac_1$ transformation temperature to $Ac_1$ transformation temperature+100° C. for 20 s to 900 s, and subsequently cooling the steel sheet.

14. A method for manufacturing the high-strength steel sheet as recited in claim 6, the method comprising:

heating a steel slab having the chemical composition containing, in mass %, C: 0.030% or more and 0.250% or less, Si: 0.01% or more and 3.00% or less, Mn: more than 4.20% and 6.00% or less, P: 0.001% or more and 0.100% or less, S: 0.0001% or more and 0.0200% or less, N: 0.0005% or more and 0.0100% or less, and Ti: 0.005% or more and 0.200% or less, and at least one selected from the group consisting of Al: 0.01% or more and 2.00% or less, Nb: 0.005% or more and 0.200% or less, B: 0.0003% or more and 0.0050% or less, Ni: 0.005% or more and 1.000% or less, Cr: 0.005% or more and 1.000% or less, V: 0.005% or more and 0.500% or less, Mo: 0.005% or more and 1.000% or less, Cu: 0.005% or more and 1.000% or less, Sn: 0.002% or more and 0.200% or less, Sb: 0.002% or more and 0.200% or less, Ta: 0.001% or more and 0.010% or less, Ca: 0.0005% or more and 0.0050% or less, Mg: 0.0005% or more and 0.0050% or less, and REM: 0.0005% or more and 0.0050% or less, and the balance being Fe and incidental impurities, to 1100° C. or higher and 1300° C. or lower;

hot rolling the steel slab with a finisher delivery temperature of 750° C. or higher and 1000° C. or lower to obtain a steel sheet;

coiling the steel sheet at 300° C. or higher and 750° C. or lower;

then subjecting the steel sheet to pickling to remove scales;

retaining the steel sheet in a temperature range of $Ac_1$ transformation temperature+20° C. to $Ac_1$ transformation temperature+120° C. for 600 s to 21,600 s;

cold rolling the steel sheet at a rolling reduction of 30% or more;

then retaining the steel sheet in a temperature range of $Ac_1$ transformation temperature to $Ac_1$ transformation temperature+100° C. for 20 s to 900 s, and subsequently cooling the steel sheet; and then subjecting the steel sheet to any one of the following:
galvanizing treatment, either alone or followed by alloying treatment at 450° C. or higher and 600° C. or lower,
hot-dip aluminum-coating treatment, or
electrogalvanizing treatment.

* * * * *